United States Patent
Ushigome

(10) Patent No.: US 8,605,358 B2
(45) Date of Patent: Dec. 10, 2013

(54) DIFFRACTIVE OPTICAL ELEMENT, OPTICAL SYSTEM, AND OPTICAL APPARATUS

(75) Inventor: Reona Ushigome, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 183 days.

(21) Appl. No.: 13/157,664

(22) Filed: Jun. 10, 2011

(65) Prior Publication Data

US 2011/0304916 A1 Dec. 15, 2011

(30) Foreign Application Priority Data

Jun. 11, 2010 (JP) ................................. 2010-133584
Feb. 25, 2011 (JP) ................................. 2011-039196

(51) Int. Cl.
*G02B 5/18* (2006.01)
(52) U.S. Cl.
USPC ............................ 359/576; 359/569; 359/571
(58) Field of Classification Search
USPC .................. 359/565, 566, 569, 571, 575, 576
See application file for complete search history.

(56) References Cited

U.S. PATENT DOCUMENTS

| 6,650,477 | B2 * | 11/2003 | Nakai | 359/569 |
| 7,042,642 | B2 * | 5/2006 | Tokoyoda et al. | 359/576 |
| 7,965,444 | B2 * | 6/2011 | Boettiger | 359/575 |
| 2009/0027776 | A1 * | 1/2009 | Schall et al. | 359/571 |
| 2010/0189956 | A1 * | 7/2010 | Etori et al. | 428/141 |

FOREIGN PATENT DOCUMENTS

| JP | 2003-240931 A | 8/2003 |
| JP | 2004-126394 A | 4/2004 |
| JP | 2009-217139 A | 9/2009 |

OTHER PUBLICATIONS

Ushigome, Reona. "Diffractive Optical Element, Optical System, and Optical Apparatus" Specification and Drawings of unpublished related co-pending U.S. Appl. No. 13/157,751, filed Jun. 10, 2011, pp. 1-72.

Ushigome, Reona. "Diffractive Optical Element, Optical System, and Optical Apparatus" Specification and Drawings of unpublished related co-pending U.S. Appl. No. 13/157,628, filed Jun. 10, 2011, pp. 1-79.

Ushigome, Reona. "Diffractive Optical Element, Optical System, and Optical Apparatus" Specification and Drawings of unpublished related co-pending U.S. Appl. No. 13/157,686, filed Jun. 10, 2011, pp. 1-75.

* cited by examiner

*Primary Examiner* — Audrey Y. Chang
(74) *Attorney, Agent, or Firm* — Rossi, Kimms & McDowell LLP

(57) ABSTRACT

A diffractive optical element includes a first diffractive grating including a first grating surface and a first grating wall surface, a light shielding member disposed on the first grating wall surface, and a second diffractive grating including a second grating surface and a second grating wall surface, disposed so that the second grating surface contacts the first grating surface and the second grating wall surface contacts the light shielding member. An extinction coefficient k of a material that constitutes the light shielding member meets the expression of $0.001 < k < 0.5$.

20 Claims, 21 Drawing Sheets

DIFFRACTIVE OPTICAL ELEMENT, OPTICAL SYSTEM, AND OPTICAL APPARATUS

BACKGROUND OF THE INVENTION

1. Field of the Invention

The present invention relates to a diffractive optical element that reduces the generation of unnecessary light.

2. Description of the Related Art

In a diffractive optical element used as a lens of an optical system, it is known that two diffractive grating are adhesively disposed and a material constituting each diffractive grating and a grating height are appropriately set to obtain a high diffraction efficiency in a wide wavelength range. Light entering a grating wall surface of the diffractive optical element which is provided with the grating surface and the grating wall surface acts differently from the grating surface, for example it is reflected or refracted on the grating wall surface, and the unnecessary light (flare) is generated. Japanese Patent Laid-Open No. 2003-240931 and Japanese Patent Laid-Open No. 2004-126394 disclose a diffractive optical element which is configured so as to reduce the unnecessary light on the grating wall surface. The diffractive optical element disclosed in Japanese Patent Laid-Open No. 2003-240931 and Japanese Patent Laid-Open No. 2004-126394 includes a light shielding member such as an opaque film or an absorption film on the grating wall surface, and it shields the light entering the grating wall surface and reduces the unnecessary light generated on the grating wall surface. Japanese Patent Laid-Open No. 2009-217139 discloses a calculation of the diffraction efficiency using the rigorous coupled wave analysis (RCWA).

However, in Japanese Patent Laid-Open No. 2003-240931 and Japanese Patent Laid-Open No. 2004-126394 do not sufficiently disclose the generation cause of the unnecessary light and do not disclose a specific configuration of the extent of the transmission, the reflection, and the absorption, with regard to the absorption film. Therefore, the unnecessary light cannot be effectively reduced.

SUMMARY OF THE INVENTION

The present invention provides a diffractive optical element that reduces the generation of unnecessary light on a grating wall surface of a diffractive grating.

A diffractive optical element as one aspect of the present invention includes a first diffractive grating including a first grating surface and a first grating wall surface, a light shielding member disposed on the first grating wall surface, and a second diffractive grating including a second grating surface and a second grating wall surface, disposed so that the second grating surface contacts the first grating surface and the second grating wall surface contacts the light shielding member. An extinction coefficient k of a material that constitutes the light shielding member meets the expression of 0.001<k<0.5.

An optical system as another aspect of the present invention includes a refractive optical element and the diffractive optical element.

An optical apparatus as another aspect of the present invention includes the optical system.

Further features and aspects of the present invention will become apparent from the following description of exemplary embodiments with reference to the attached drawings.

DESCRIPTION OF THE PREFERRED EMBODIMENTS

Figure 1:
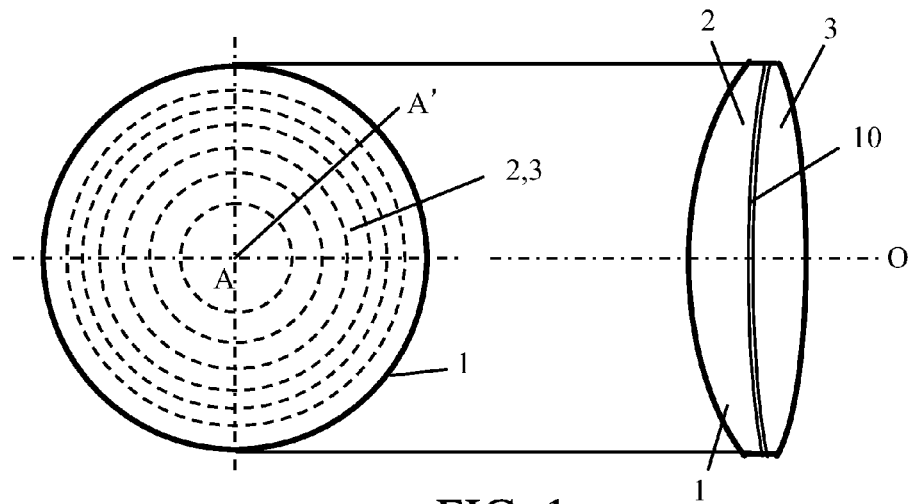
FIG. 1 is a schematic diagram of a diffractive optical element in the present embodiment.

Exemplary embodiments of the present invention will be described below with reference to the accompanied drawings. In each of the drawings, the same elements will be denoted by the same reference numerals and the duplicate descriptions thereof will be omitted.

Embodiment 1

First of all, a diffractive optical element in Embodiment 1 of the present invention will be described. FIG. 1 is a schematic diagram (a front view and a side view) of the diffractive optical element in the present embodiment. A diffractive optical element 1 is configured by including a diffractive grating 10 disposed between substrates 2 and 3 configured by a plane plate or a lens. In the present embodiment, surfaces of the substrates 2 and 3 on which the diffractive grating 10 is provided have curved surfaces. The diffractive grating 10 has a concentric diffractive grating shape around an optical axis O, which has a lens function.

Figure 2:
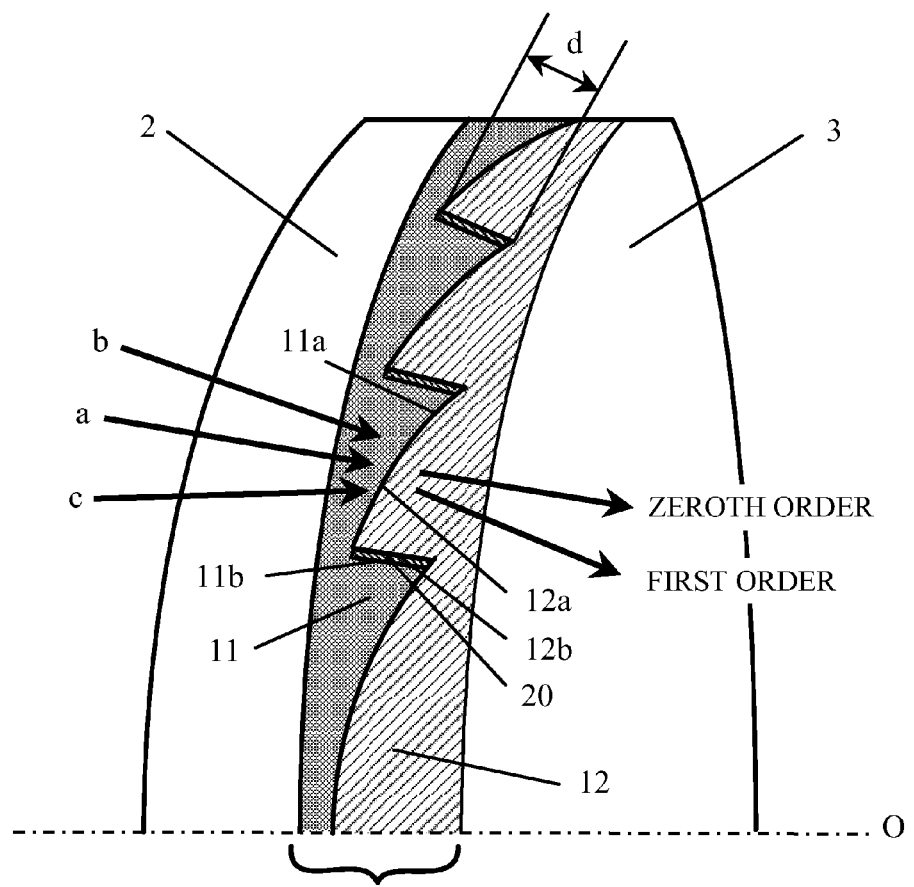
FIG. 2 is an enlarged cross-sectional diagram of the diffractive optical element in the present embodiment.

FIG. 2 is an enlarged cross-sectional diagram of the diffractive optical element 1 which is obtained by cutting and enlarging an A-A' plane of FIG. 1. For easy understanding of a grating shape, FIG. 2 is deformed in a grating depth direction. The number of gratings is depicted so as to be smaller than in reality. The same is applied to cross-sectional diagrams that will be described below. As illustrated in FIG. 2, the diffractive grating 10 of the diffractive optical element 1 is configured by including a first diffractive grating 11, a second diffractive grating 12, and a light shielding member 20. The first diffractive grating 11 includes a grating surface 11a (a first grating surface) and a grating wall surface 11b (a first grating wall surface), and has a first refractive index. The second diffractive grating 12 includes a grating surface 12a (a second grating surface) and a grating wall surface 12b (a second grating wall surface). The second diffractive grating 12 has a second refractive index that is different from the first refractive index. The grating surface 11a of the first diffractive grating 11 contacts (closely contacts) the grating surface 12a of the second diffractive grating 12. The light shielding member 20 is disposed between the grating wall surfaces 11b and 12b, and has a film-shaped structure. The grating wall surface 11b contacts on surface of the light shielding member 20 and the grating wall surface 12b contacts the other surface of the light shielding member 20.

As illustrated in FIGS. 1 and 2, the first diffractive grating 11 and the second diffractive grating 12 are diffractive gratings having concentric-shaped blazed structures that are configured by the grating surfaces 11a and 12a and the grating wall surfaces 11b and 12b, respectively. A grating pitch is gradually changed with the approach from the optical axis O to an outer circumference of the circle to have a lens function (a convergent function and a divergent function). The grating surfaces 11a and 12a and the grating wall surfaces 11b and 12b contact without any gaps via the light shielding member 20, and the first diffractive grating 11 and the second diffractive grating 12 totally function as one diffractive grating 10. Since the diffractive grating 10 is configured to have the blazed structure, light (incident light) entering the diffractive optical element 1 is concentrated to be diffracted in a specific diffractive order (+1st order in the present embodiment) direction with respect to 0th order diffractive direction in which the light transmits through the diffractive grating 10 without diffraction.

A use wavelength range of the diffractive optical element 1 of the present embodiment is a visible range. Therefore, materials of the first diffractive grating 11 and the second diffractive grating 12 and their grating heights d are selected so that a diffraction efficiency of the diffracted light having the designed order is improved in a whole of the visible range. In other words, the material and the grating height d of each diffractive grating are determined so that the maximum optical path length difference (the maximum value of the optical path length difference of a peak and a valley of the diffractive portion) of the light passing the plurality of diffractive gratings (the first diffractive grating 11 and the second diffractive grating 12) is near an integral multiple of the wavelength in the use wavelength range. The material and the shape of the diffractive grating are appropriately designed as described above to obtain a high diffraction efficiency in the whole of the use wavelength range.

Figure 3A:
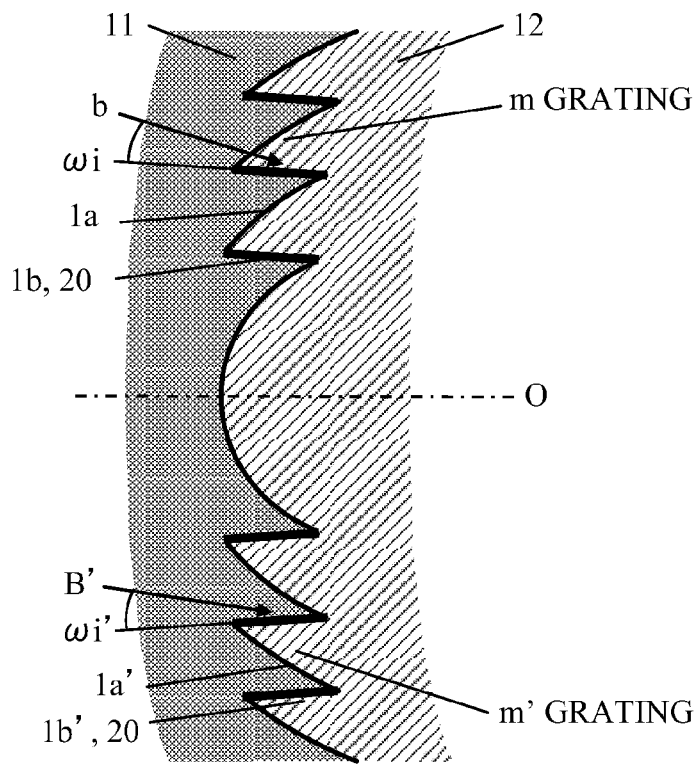
FIGS. 3A and 3B are enlarged cross-sectional diagrams of a diffractive optical part in Embodiment 1.

Subsequently, a configuration of the diffractive optical element 1 and unnecessary light in the present embodiment will be described. FIG. 3A is an enlarged cross-sectional diagram of the diffractive grating 10 that constitutes the diffractive optical element 1. In FIG. 3A, obliquely incident lights B and B' entering at an angle of ω with reference to the optical axis O enter an m grating and m' grating that are an m-th diffractive grating counted in an upward direction in the drawing and an m-th diffractive grating counted in an downward direction. The incident angles of the obliquely incident lights B and B' for the m grating and the m' grating are angles of ωi and ωi' with reference to a principal ray direction, respectively. In the embodiment, directions of the grating wall surfaces 1b and 1b' are equal to the principal ray direction. In the present embodiment, the incident angle ω of the obliquely incident lights B and B' is around +10 degrees.

Figure 3B:
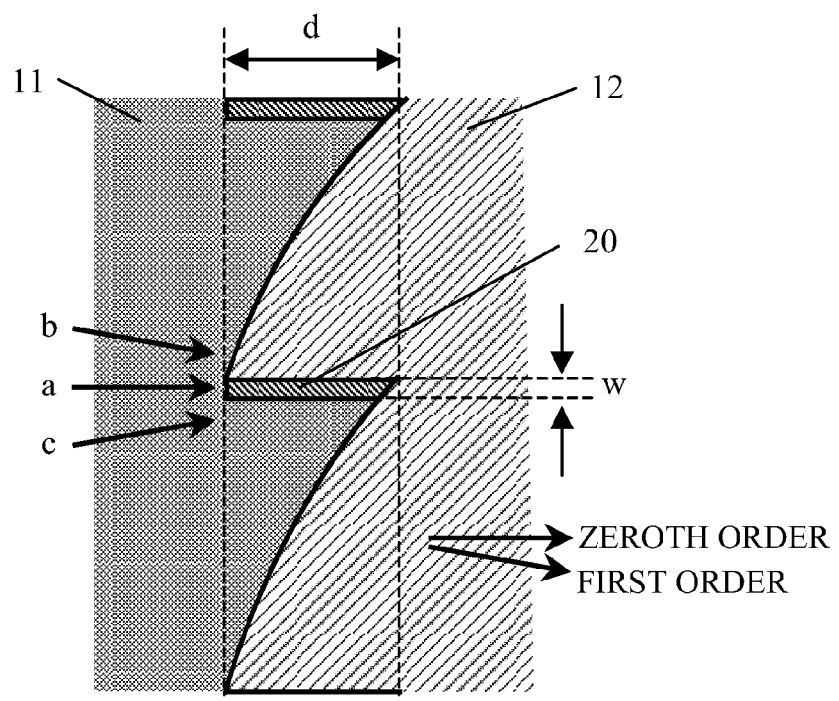

FIG. 3B is a further enlarged cross-sectional diagram of the diffractive grating 10. In the present embodiment, as the material of the first diffractive grating 11, a resin (nd=1.481, vd=20.7, θgF=0.404, n550=1.483) obtained by mixing a fluorinated acrylic ultraviolet curable resin with ITO fine particles is used. As the material of the second diffractive grating 12, an acrylic ultraviolet curable resin (nd=1.524, vd=51.6, θgF=0.539, n550=1.524) is used. The grating height d of each diffraction grating is 13.51 μm, and the designed order is +1st order. In order to reduce the unnecessary light, the light shielding member 20 having a film shape is provided along the grating wall surfaces 1b and 1b'. The light shielding member 20 has a thin film shape of a uniform thickness along the grating wall surfaces 1b and 1b', and it functions to prevent a total reflection that is generated on the grating wall surface 1b of the m grating and also to reduce the transmitted light generated on the grating wall surface 1b' of the m' grating. A material constituting the light shielding member 20 is an absorption material having a refractive index of n=1.5 and an extinction constant of k=0.1, and a width w of the film shape is 0.2 μm.

Figure 4A:
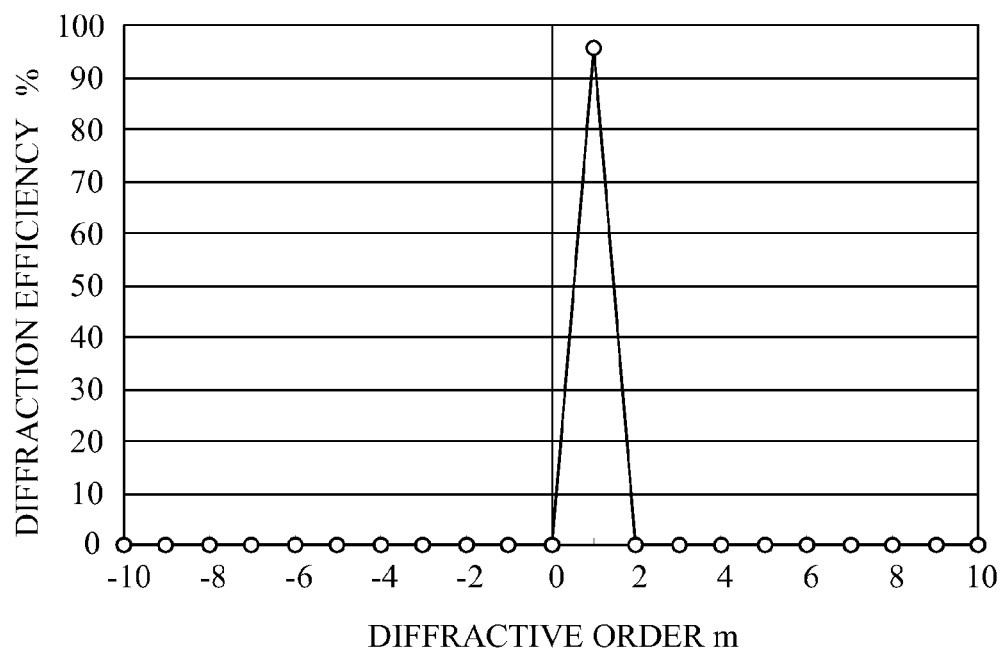
FIGS. 4A and 4B are graphs of diffraction efficiencies for light having an incident angle of +10 degrees in the diffractive optical element of Embodiment 1.
Figure 4B:
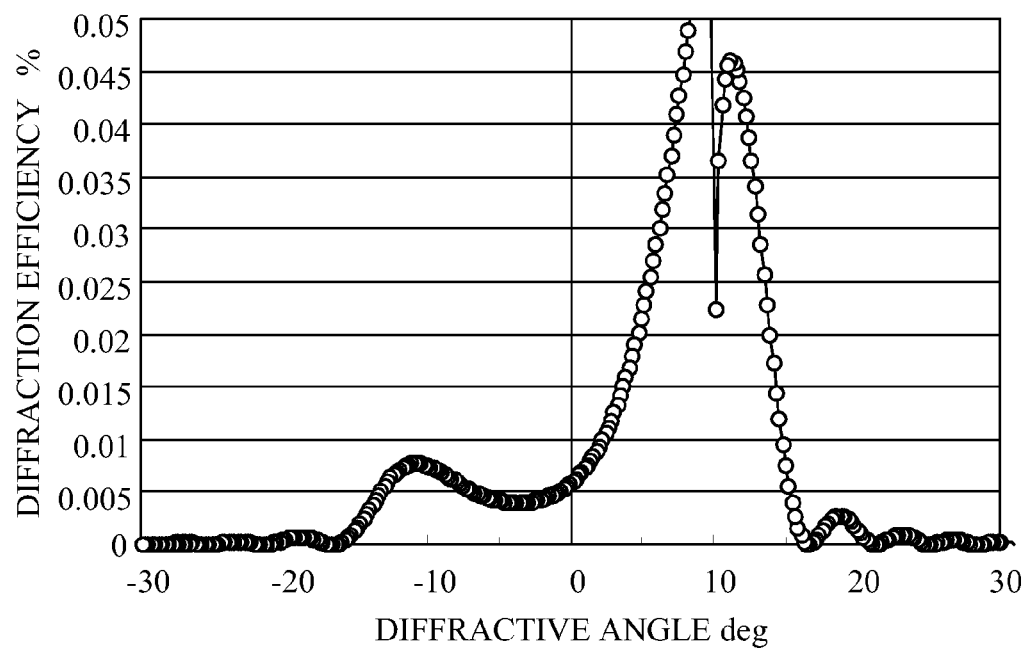

In the embodiment, light ("b" in FIG. 3B, and "B" in FIG. 3A) that enters the diffractive optical element 1 at an obliquely incident angle of a downward direction with reference to the designed incident angle ("a" in FIG. 3B: 0 degree) is assumed. FIGS. 4A and 4B are an RCWA (Rigorous Coupled Wave Analysis) calculation result on conditions that the incident angle is +10 degrees, the grating pitch is 100 μm, and the wavelength is 550 nm. In FIGS. 4A and 4B, the downward direction in FIG. 3B is a positive direction of the incident angle. FIG. 4A is a diffraction efficiency near the +1st order diffracted light that is the designed order. A lateral axis indicates a diffractive order, and a vertical axis indicates a diffraction efficiency. FIG. 4B is a result of enlarging a part where the diffraction efficiency indicated by the vertical axis of FIG. 4A is small and of changing the lateral axis from the diffractive order to a diffractive angle to illustrate a high diffractive angle range. The downward direction in FIG. 3B is a positive direction of the diffractive angle. As illustrated in FIG. 4A, the diffraction efficiency of the +1st order diffracted light that is the designed order is concentrated, but the diffraction efficiency is 95.41%. The remaining unnecessary light, as illustrated in FIG. 4B, propagates as unnecessary light which has a peak in a specific angle direction. This unnecessary light has a peak in a direction of around −10 degrees, and the diffraction efficiency of this peak is 0.0077%. In the present embodiment, the diffraction efficiency of the peak of this unnecessary light is extremely reduced. This means that a total reflection of the light entering the grating wall surface from a side of a high refractive index material (the second diffractive grating 12 having the second refractive index) is reduced by the light shielding member having the thin film shape provided on the grating wall surface. As a result, the unnecessary light is extremely reduced.

Figure 5A:
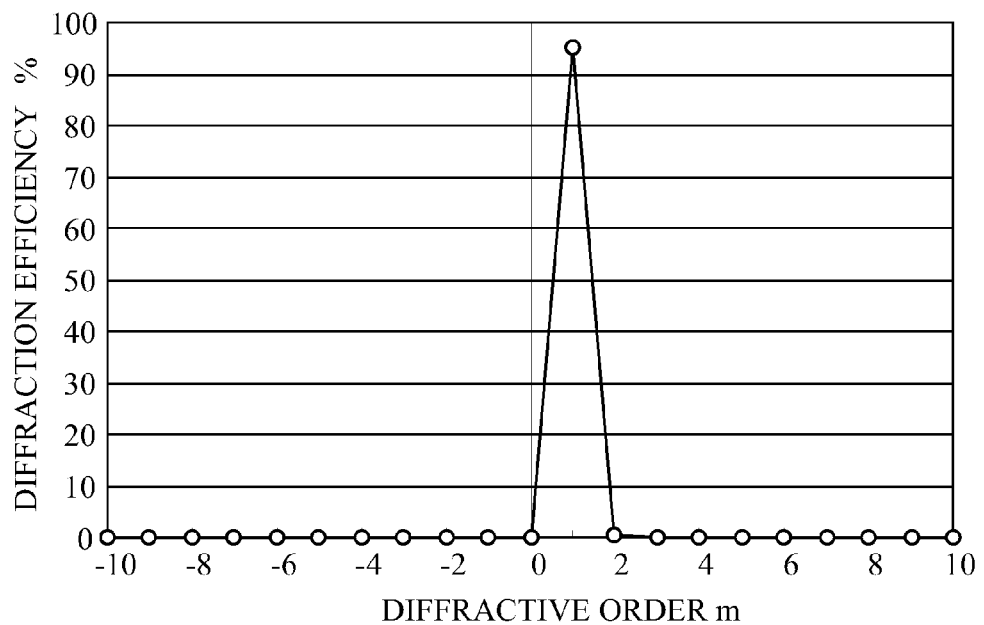
FIGS. 5A and 5B are graphs of diffraction efficiencies for light having an incident angle of −10 degrees in the diffractive optical element of Embodiment 1.
Figure 5B:
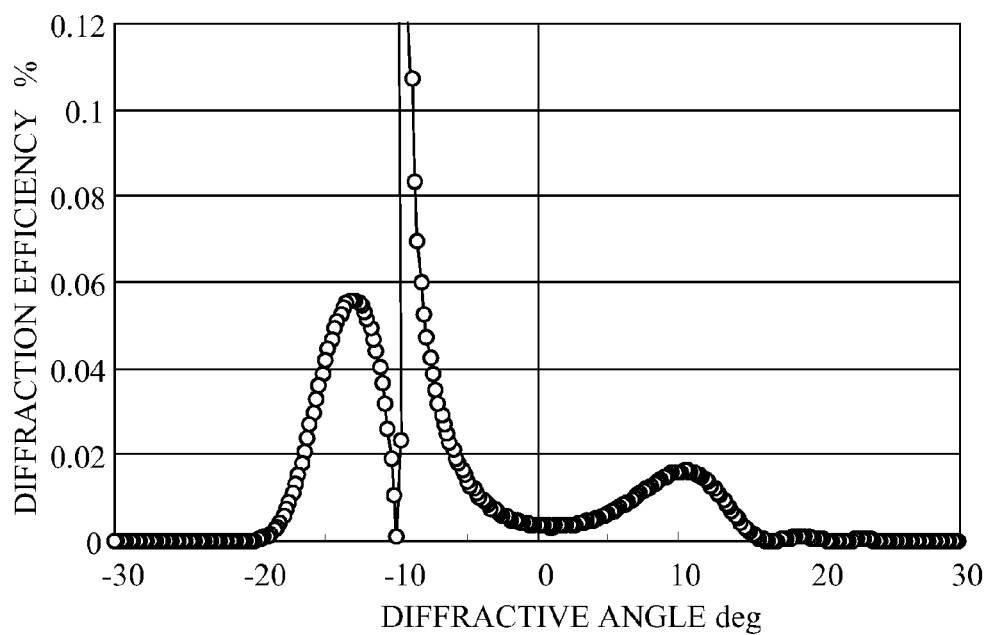

Next, light ("c" in FIG. 3B, and "B'" in FIG. 3A) that enters the diffractive optical element 1 at an obliquely incident angle of an upward direction with reference to the designed incident angle is assumed. FIGS. 5A and 5B are an RCWA calculation result on conditions that the incident angle is −10 degrees, the grating pitch is 100 μm, and the wavelength is 550 nm. The downward direction in FIG. 3B is a positive direction of the incident angle (the upward direction is a positive direction in the m' grating of FIG. 3A). FIG. 5A is a diffraction efficiency near the +1st order diffracted light that is the designed order. A lateral axis indicates a diffractive order, and a vertical axis indicates a diffraction efficiency. FIG. 5B is a result of enlarging a part where the diffraction efficiency indicated by the vertical axis of FIG. 5A is small and of changing the lateral axis from the diffractive order to a diffractive angle to illustrate a high diffractive angle range. The downward direction of FIG. 3B is a positive direction of the diffractive angle (the upward direction is a positive direction in the m' grating of FIG. 3A). As illustrated in FIG. 5A, the diffraction efficiency of the +1st order diffracted light that is the designed order is concentrated, and the diffraction efficiency is 95.16%. The remaining unnecessary light, as illustrated in FIG. 5B, propagates as unnecessary light which has a peak in a specific angle direction. This unnecessary light has a peak in a direction of around −13 degrees, and the diffraction efficiency of this peak is 0.056%. The unnecessary light also has a peak in a direction of around +10 degrees, and the diffraction efficiency of this peak is 0.016%. According to the configuration of the present embodiment, a part of the light entering the grating wall surface from a side of a low refractive index medium (the first diffractive grating 11 having the first refractive index) is reduced by the light shielding member 20. As a result, the unnecessary light is reduced.

As described above, in the diffractive optical element of the present embodiment, the total reflection light of the light entering the grating wall surface from the side of the high refractive index medium is reduced by providing the light shielding member on the grating wall surface when the obliquely incident light enters. Furthermore, the transmitted light of the light entering the grating wall surface from the low refractive index medium is reduced by the light shielding member. Thus, the light shielding member reduces the total reflection light and the transmitted light that are generated at an interface of the high refractive index medium (the second diffractive grating 12) and the low refractive index medium (the first diffractive grating 11) separated by the grating wall surface. According to the diffractive grating of the present embodiment, since the unnecessary light can be reduced, the unnecessary light that reaches an imaging plane is reduced and the deterioration of the image performance can be decreased.

In the embodiment, the grating pitch set to 100 μm. Furthermore, since the contribution of the wall surface is small in the annular zone having a wide grating pitch, the diffraction efficiency of the designed order is high and the diffraction efficiency of the unnecessary light is low. A propagation direction of this unnecessary light does not depend on the grating pitch (not shown), and the propagation direction is identical. Therefore, as one reference, the diffraction efficiency of the grating pitch of 100 μm is indicated.

In the present embodiment, a method of manufacturing the light shielding member 20 is not especially limited. As one example, there is a method of forming a material that constitutes the light shielding member only on the grating wall surface selectively from an oblique direction by using an evaporation method or the like after the first diffractive grating 11 or the second diffractive grating 12 is manufactured. A method of forming the material using a mask pattern selectively by using the evaporation method or the like, a method of directly forming it only on the grating wall surface by using an ink jet process, or the like can also be used. A method of applying it selectively to the grating wall surface using another wet process can also be used. Furthermore, for example, after the first diffractive grating 11 or the second diffractive grating 12 is manufactured, a method of selectively forming a sacrificial material only on the grating oblique part (the grating surface) and then forming a material that constitutes the light shielding member in a whole range of the diffractive grating to eliminate the material constituting the sacrificial material and the light shielding member may also be used. Additionally, for example, after the first diffractive grating 11 or the second diffractive grating 12 is manufactured, a method of selectively eliminating only the grating surface by using a selective etching or the like can also be used. In the present embodiment, the designed order is set to +1st order, but the same effect can be obtained even if the designed order other than the +1st order, and therefore the embodiment is not limited to the designed order. In the present embodiment, the case where the relation of the refractive indexes of the first diffractive grating 11 and the second diffractive grating 12 is n11<n22 is described, but the same effect can be obtained when the relation of the refractive indexes is n11>n22.

Embodiment 2

Next, a diffractive optical element in Embodiment 2 of the present invention will be described. In the diffractive optical element of the present embodiment, a material constituting a light shielding member and its width are different from those of Embodiment 1. The material constituting the light shielding member of the present embodiment is an absorption material having a refractive index of n=1.5 and an extinction coefficient of K=0.01, and the width w of the light shielding member 20 is 2.0 μm. Since other configurations of the diffractive optical element are the same as those of Embodiment 1, descriptions thereof are omitted.

Figure 6A:
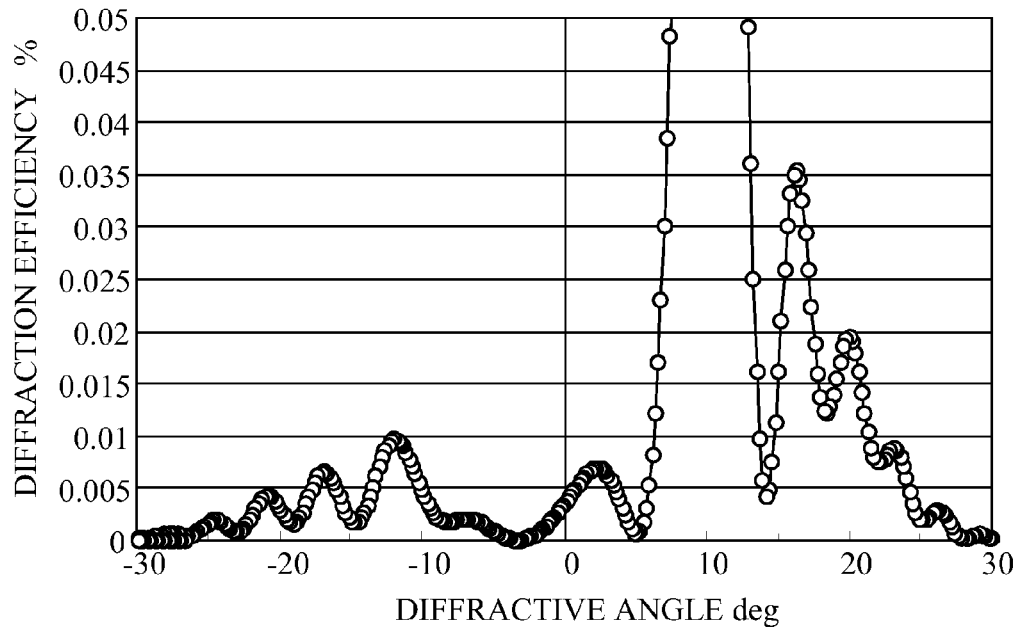
FIGS. 6A and 6B are graphs of diffraction efficiencies for light having an incident angle of ±10 degrees in the diffractive optical element of Embodiment 2.

In the embodiment, considering light that enters the diffractive optical element at an obliquely incident angle of a downward direction with reference to the designed incident angle, FIG. 6A illustrates the RCWA calculation result on conditions that the incident angle is +10 degrees, the grating pitch is 100 μm, and the wavelength is 550 nm. The diffraction efficiency of the +1st order diffracted light that is the designed order is 91.62%. The remaining unnecessary light, as illustrated in FIG. 6A, has many peaks to propagate. According to the configuration of the present embodiment, since total reflection of the light entering the grating wall surface from the side of the high refractive index medium is reduced, the peak of the unnecessary light in a direction of around −10 degrees is not substantially appeared.

The width w of the light shielding member is 2.0 μm which is thicker than that of Embodiment 1. Therefore, a phase difference is generated between the first diffractive grating 11 and the second diffractive grating 12, and diffracted light having comparatively low orders (low angles) other than the 1st diffracted light from +5 to +15 degrees and diffracted light having comparatively large peaks of around +18 degrees and +20 degrees are generated. Since it is rare that these diffracted lights having the comparatively low orders (low angles) reach the imaging plane to deteriorate the image performance when an off-screen light of a high brightness light source such as sun is incident, the impact is small. Small peaks of the unnecessary light are appeared at angles larger than −10 degrees, but amounts of these unnecessary lights is small, and therefore the unnecessary light can be reduced as a whole of the diffractive optical element.

Figure 6B:
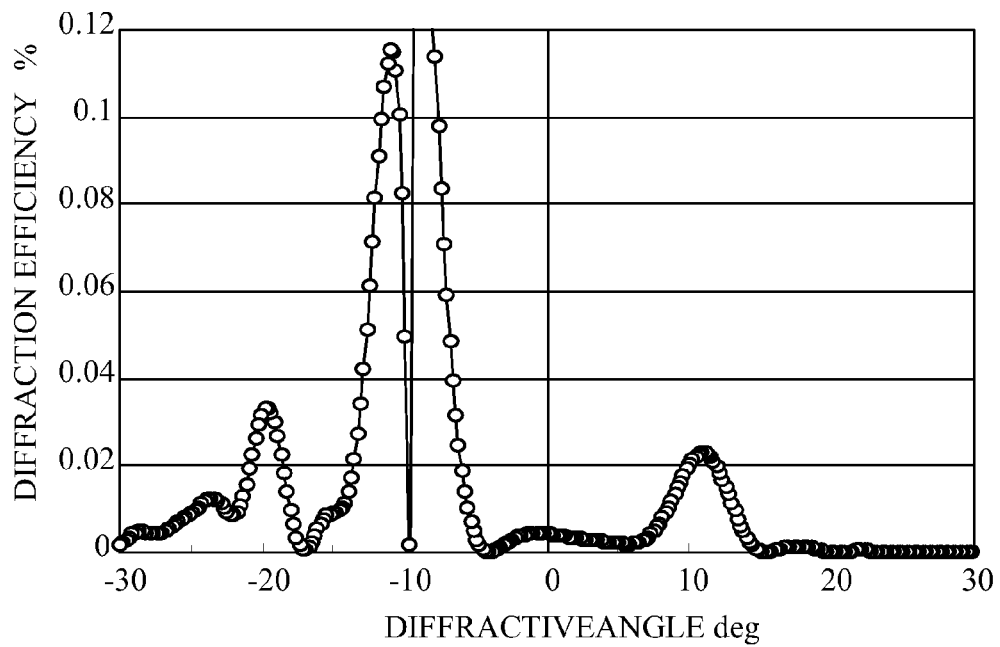

Next, light that enters the diffractive optical element 1 at an obliquely incident angle of an upward direction with reference to the designed incident angle is assumed. FIG. 6B is an RCWA calculation result on conditions that the incident angle is −10 degrees, the grating pitch is 100 μm, and the wavelength is 550 nm. The diffraction efficiency of the +1st order diffracted light that is the designed order is 91.52%. The remaining unnecessary light, as illustrated in FIG. 6B, propagates as unnecessary light which has a peak in a specific angle direction. This unnecessary light has a peak in a direction of around −20 degrees, and the diffraction efficiency of this peak is 0.033%. The unnecessary light also has a peak in a direction of around +10 degrees, and the diffraction efficiency of this peak is 0.023%. In the present embodiment, since the peak of the unnecessary light in one angle direction can be decreased, total of the unnecessary light is reduced.

As described above, in the diffractive optical element of the present embodiment, the total reflection light of the light entering the grating wall surface from the side of the high refractive index medium is reduced by providing the light shielding member on the grating wall surface when the obliquely incident light enters the diffractive optical element. Furthermore, the transmitted light of the light entering the grating wall surface from the low refractive index medium is reduced by the light shielding member. Therefore, the unnecessary light reaching the imaging plane is reduced by the decrease of the unnecessary light, and the deterioration of the image performance can be decreased.

As a material constituting the light shielding member 20 of the present embodiment, for example, a material obtained by dispersing carbon-based fine particles such as a black carbon, a metal compound fine particles such as a metal oxide, a metal sulfide, or a metal carbonate, a material configured by dispersing a pigment, a dye, or the like, into a resin is used. It can also be realized by a structure having the equivalent effect by a fine structure, a carbon nanotube, or the like. In this case, it is preferable that the material is configured in accordance with the refractive index of the diffractive grating and the extinction coefficient.

Since the reduction effect of the total reflection light is large when the refractive index of the material constituting the light shielding member is higher than a lower refractive index (for example, the first refractive index of the first diffractive grating 11) of the diffractive indexes of the two diffractive gratings, it is preferable.

When the extinction coefficient k of the material constituting the light shielding member 20 is less than or equal to 0.001, the film thickness w becomes thicker in order to reduce the total reflection light. Therefore, it is not preferable because the phase difference between the first diffractive grating 11 and the second diffractive grating 12 is generated and the designed diffraction efficiency is deteriorated. On the other hand, when the extinction coefficient k of the material constituting the light shielding member 20 is greater or equal to 0.5, it is not preferable because the reflected light of the incident light at an obliquely incident angle of the upward direction with reference to the designed incident angle increases and the flare light increases. Accordingly, it is preferable that the extinction coefficient k of the material constituting the light shielding member 20 meets the following Expression (1).

$$0.001 < k < 0.5 \tag{1}$$

Expression (1) is a conditional expression that is used for reducing the unnecessary light, and it is preferable that the extinction coefficient k of the material constituting the light shielding member 20 meets the following Expression (2) in order to improve the effect of the light shielding member 20.

$$0.005 < k < 0.3 \tag{2}$$

Embodiment 3

Figure 7:
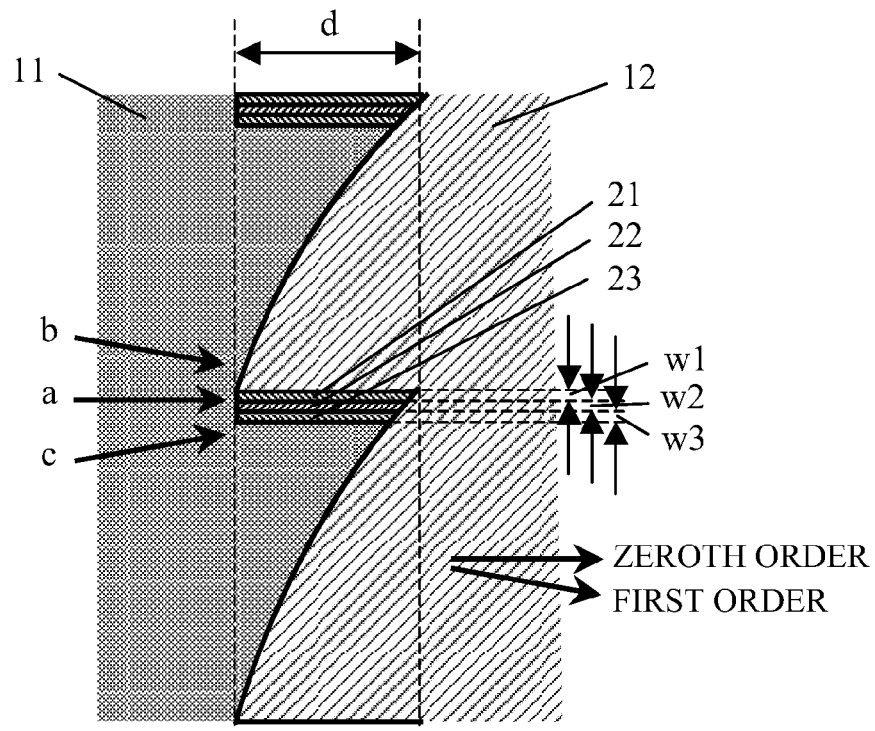
FIG. 7 is an enlarged cross-sectional diagram of a diffractive optical part in Embodiment 3.

Next, a diffractive optical element in Embodiment 3 of the present invention will be described. In the present embodiment, the light shielding member is different from that of each embodiment described above in that it has a plurality of film-shaped structures obtained by laminating members of a plurality of materials different from each other. FIG. 7 is an enlarged cross-sectional diagram of a diffractive grating in the present embodiment. As illustrated in FIG. 7, in the present embodiment, light shielding members 21, 22, and 23 each having a film-shaped structure along the grating wall surface are laminated from a side of the grating wall surface of the second diffractive member 12 as a member to reduce unnecessary light. Each of the light shielding members 21, 22, and 23 has a thin film-shaped structure having a uniform thickness along the grating wall surface. The combination of the light shielding members 21, 22, and 23 has functions of preventing the total reflection generated on the grating wall surface of the m grating by the combination of the three layers, and of reducing the transmitted light generated on the grating wall surface of the m' grating. The material constituting the light shielding member 21 is an absorption material having a refractive index of n=1.55 and an extinction coefficient of k=0.03, and a width w1 of the light shielding member 21 is 0.2 μm. The material constituting the light shielding member 22 is an absorption material having a refractive index of n=1.40 and an extinction coefficient of k=0.09, and a width w2 of the light shielding member 22 is 0.25 μm. The material constituting the light shielding member 23 is an absorption material having a refractive index of n=1.53 and an extinction coefficient of k=0.03, and a width w3 of the light shielding member 23 is 0.15 μm. The light shielding members 21, 22, and 23 having the three-layer structure are designed so as to reduce the total reflection when the obliquely incident light enters the side of the low refractive index medium from the high refractive index medium, and also to reduce the transmission and the reflection when it enters the side of the high refractive index medium from the low refractive index medium.

Figure 8A:
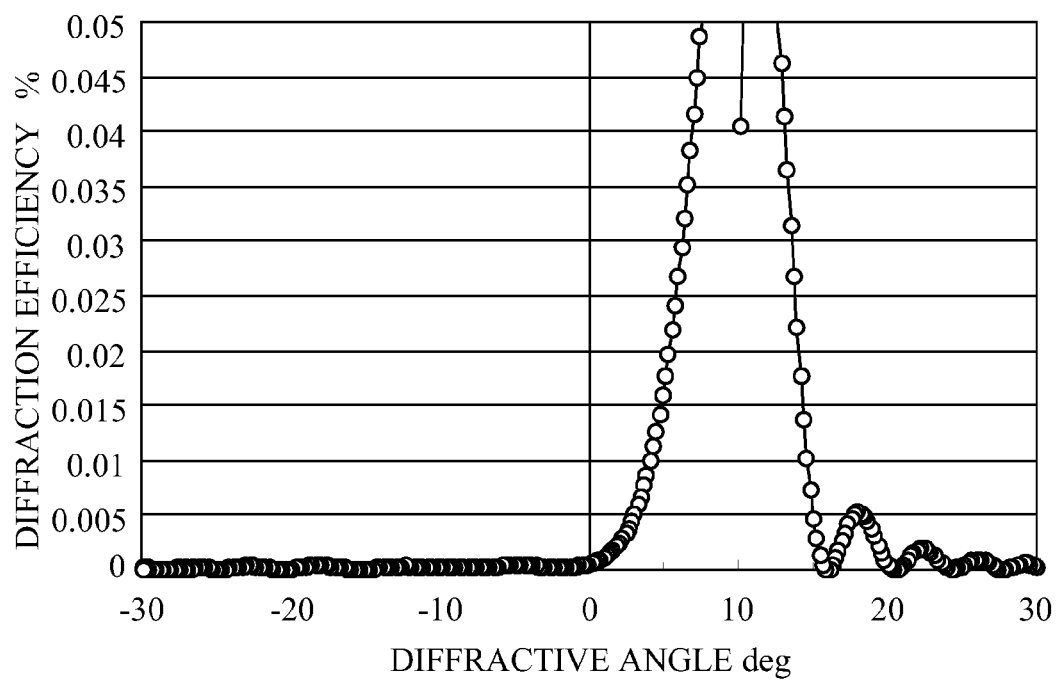
FIGS. 8A and 8B are graphs of diffraction efficiencies for light having an incident angle of ±10 degrees in the diffractive optical element of Embodiment 3.

In the embodiment, light that enters the diffractive optical element at an obliquely incident angle of a downward direction with reference to the designed incident angle is assumed. FIG. 8A is an RCWA calculation result on conditions that the incident angle is +10 degrees, the grating pitch is 100 μm, and the wavelength is 550 nm. As illustrated in FIG. 8A, the diffraction efficiency of the +1st order diffracted light that is the designed order is 91.52%. The remaining unnecessary light, as illustrated in FIG. 8A, propagates as unnecessary light. According to the configuration of the present embodiment, the total reflection of the light entering the grating wall surface from the side of the high refractive index medium is reduced by the light shielding member having a thin film shape provided on the grating wall surface. The diffracted light having comparatively-low orders from +5 to +15 degrees other than +1st order light is generated since a width w1+w2+w3 of the light shielding members 21, 22, and 23 is thicker than the width w of the light shielding member 20 of Embodiment 1 and the phase difference between the first diffractive grating 11 and the second diffractive grating 12 is generated. It is rare that these diffracted lights having comparatively low orders reach the imaging plane to deteriorate the image performance when the off-screen light of the high brightness light source such as sun are incident, and therefore the impact is small.

Figure 8B:
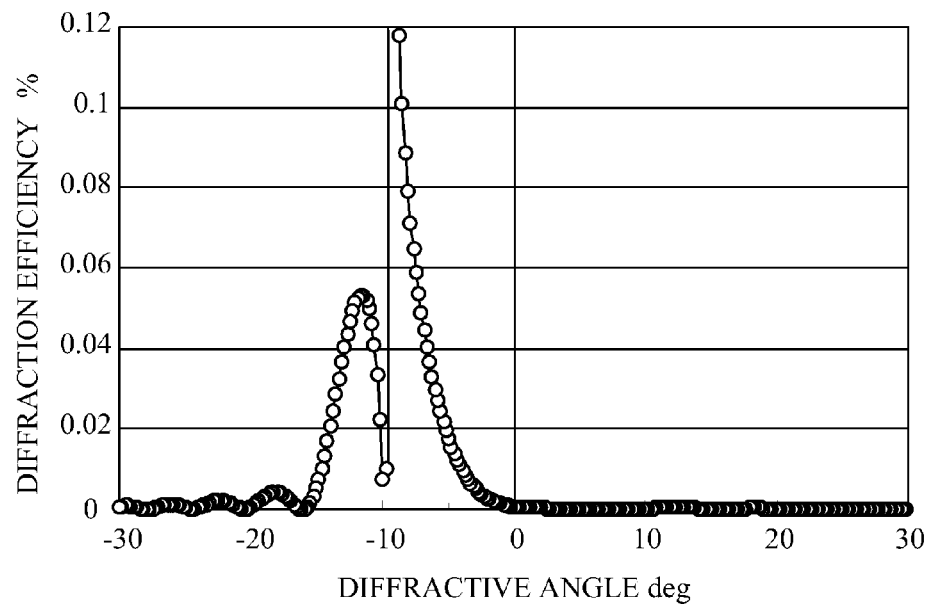

Next, light that enters the diffractive optical element at an obliquely incident angle of an upward direction with reference to the designed incident angle is assumed. FIG. 8B is an RCWA calculation result on conditions that the incident angle is −10 degrees, the grating pitch is 100 μm, and the wavelength is 550 nm. The diffraction efficiency of the +1st order diffracted light that is the designed order is 94.12%. The remaining unnecessary light, as illustrated in FIG. 8B, propagates as unnecessary light. In the embodiment, since a part of light entering the grating wall surface from the side of the low refractive index medium is reflected and the remaining transmitted light is reduced by the light shielding member by the light shielding member having a thin film shape provided on the grating wall, the unnecessary light is reduced.

In the configuration of the present embodiment, each parameter of the number of layers of the light shielding member, the refractive index, the extinction coefficient, and the film thickness is not limited to this, and these parameters are appropriately designed to be able to reduce the unnecessary light.

Embodiment 4

Next, a diffractive optical element in Embodiment 4 of the present invention will be described. The present embodiment is different from Embodiments 1 to 3 in the material of the diffractive grating and the grating height. Hereinafter, an element structure of the diffractive optical element and unnecessary light in the present embodiment will be described. The configuration of the diffractive grating is the same as that of the diffractive grating 10 of Embodiment 1 illustrated in FIGS. 3A and 3B. As the material that forms the first diffractive grating 11, a resin (nd=1.504, νd=16.3, θgF=0.390, n550=1.511) obtained by mixing a fluorinated acrylic ultraviolet curable resin with ITO fine particles is used. As the material that forms the second diffractive grating 12, a resin (nd=1.567, νd=47.0, θgF=0.569, n550=1.570) obtained by mixing an acrylic ultraviolet curable resin with ZrO2 fine particles is used. The grating height d is 9.29 μm, and the designed order is +1st order. A material that constitutes the light shielding member 20 is an absorption material having a refractive index of n=1.55, and an extinction coefficient of k=0.1, and a width w of the light shielding member 20 is 0.2 μm.

Figure 9A:
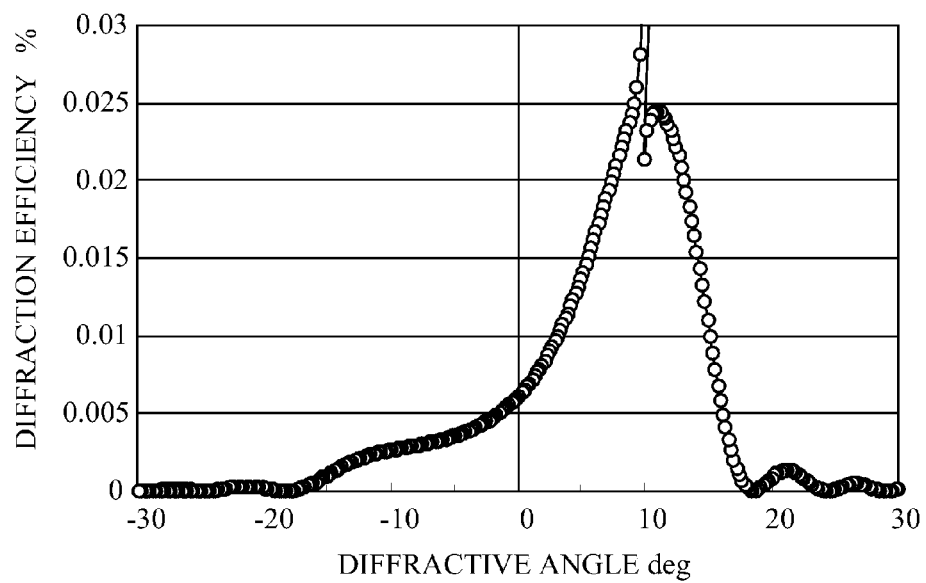
FIGS. 9A and 9B are graphs of diffraction efficiencies for light having an incident angle of ±10 degrees in the diffractive optical element of Embodiment 4.

In the embodiment, light that enters the diffractive optical element at an obliquely incident angle of a downward direction with reference to the designed incident angle is assumed. FIG. 9A is an RCWA calculation result on conditions that the incident angle is +10 degrees, the grating pitch is 100 μm, and the wavelength is 550 nm. The diffraction efficiency of the +1st order diffracted light that is the designed order is 96.89%. The remaining unnecessary light, as illustrated in FIG. 9A, propagates as unnecessary light having a peak in a specific angle direction. According to the configuration of the present embodiment, since the total reflection of the light entering the grating wall surface from the side of the high refractive index medium is reduced by the light shielding member having a thin film shape provided on the grating wall surface, the unnecessary light can be decreased.

Figure 9B:
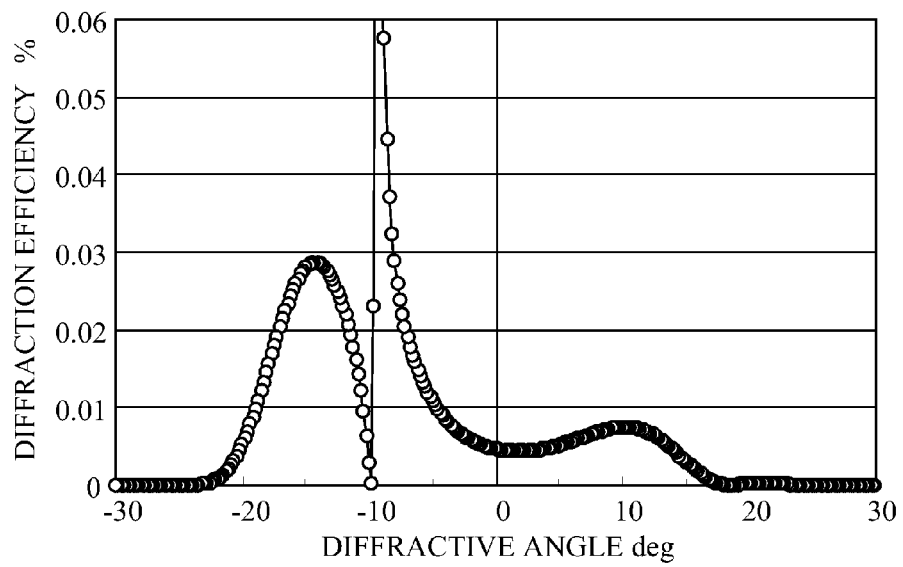

Next, light that enters the diffractive optical element 1 at an obliquely incident angle of an upward direction with reference to the designed incident angle is assumed. FIG. 9B is an RCWA calculation result on conditions that the incident angle is −10 degrees, the grating pitch is 100 μm, and the wavelength is 550 nm. The diffraction efficiency of the +1st order diffracted light that is the designed order is 96.69%. The remaining unnecessary light, as illustrated in FIG. 9B, propagates as unnecessary light which has a peak in a specific angle direction. This unnecessary light has a peak in a direction of around −15 degrees, and the diffraction efficiency of this peak is 0.029%. The unnecessary light also has a peak in a direction of around +10 degrees, and the diffraction efficiency of this peak is 0.0075%. According to the configuration of the present embodiment, since part of the light entering the grating wall surface from the side of the low refractive index medium is reflected and the remaining transmitted light is decreased by the light shielding member, the unnecessary light can be reduced.

As the material of the diffractive grating in the present embodiment, a resin material and a material obtained by dispersing fine particles are used, but the embodiment is not limited to this. For example, an organic material such as a resin material, a glass material, an optical crystal material, a ceramics material may also be used. As the fine particle material to disperse the fine particles, an inorganic fine particle material of any of an oxide, a metal, a ceramics, a compound, and a mixture can be used, but the embodiment is not limited to these fine particle materials. It is preferable that an average particle diameter of the fine particle material is less than or equal to one fourth of the wavelength (the use wavelength or the designed wavelength) of the incident light on the diffractive optical element. If the diameter of the particle is greater than this, the Rayleigh scattering may be larger when mixing the fine particle material with the resin material. As the resin material with which the fine particle material is mixed, an ultraviolet curable resin that is an organic resin of any of an acrylic system, a fluorine system, a vinyl system, and an epoxy system is suitably used, but the embodiment is not limited to these resin materials.

Embodiment 5

Figure 10:
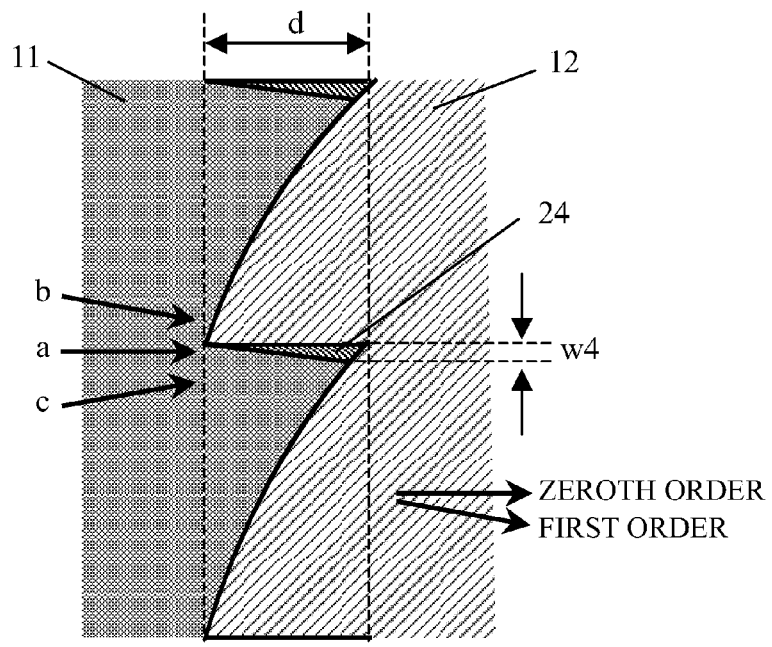
FIG. 10 is an enlarged cross-sectional diagram of a diffractive optical part in Embodiment 5.

Next, a diffractive optical element in Embodiment 5 of the present invention will be described. The present embodiment is different from Embodiments 1 to 4 in that a width of the light shielding member is different in accordance with a position (a height) of the grating wall surface (the first grating wall surface and the second grating wall surface). In other words, the light shielding member of the present embodiment does not have a uniform thickness (width) along the grating wall surface. FIG. 10 is an enlarged cross-sectional diagram of the diffractive grating in the present embodiment. The material constituting the diffractive grating, the grating height d, and the designed order are the same as those of Embodiment 4.

A light shielding member 24 of the present embodiment does not have a uniform film shape along the grating wall surface, and it has a structure in which the light shielding member becomes thicker from the apex of the diffractive grating up to the position of the width w4. The light shielding member 24 has functions of preventing the total reflection that is generated on the grating wall surface of the m grating and of reducing the transmitted light that is generated on the grating wall surface of the m' grating. The material constituting the light shielding member 24 is an absorption material having a refractive index of n=1.55 and an extinction constant of k=0.1, and the width w4 of the light shielding member 24 is 0.2 μm.

Figure 11A:
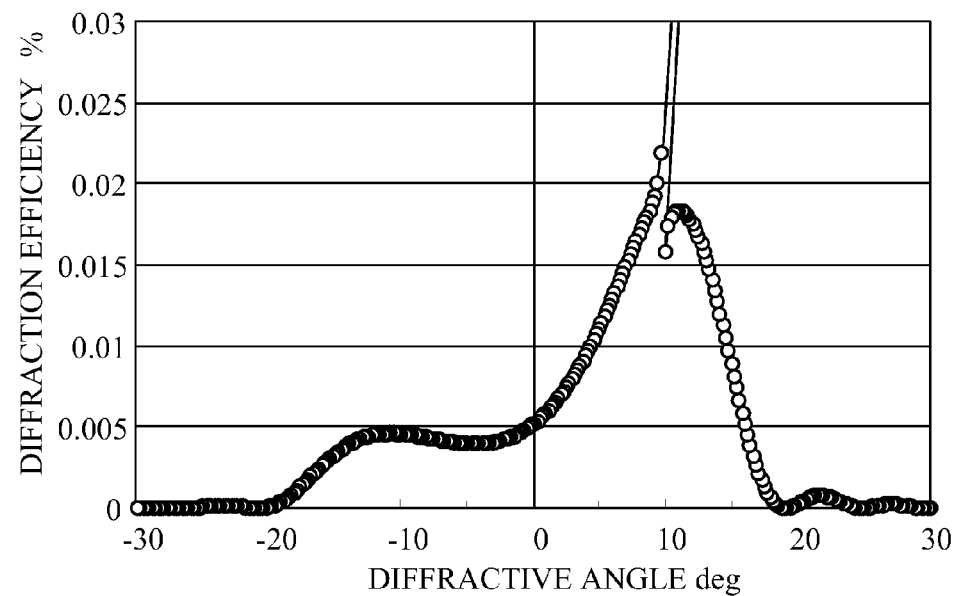
FIGS. 11A and 11B are graphs of diffraction efficiencies for light having an incident angle of ±10 degrees in the diffractive optical element of Embodiment 5.

In the embodiment, light that enters the diffractive optical element at an obliquely incident angle of a downward direction with reference to the designed incident angle is assumed. FIG. 11A is an RCWA calculation result on conditions that the incident angle is +10 degrees, the grating pitch is 100 μm, and the wavelength is 550 nm. The diffraction efficiency of the +1st order diffracted light that is the designed order is 97.28%. The remaining unnecessary light, as illustrated in FIG. 11A, propagates as unnecessary light having a peak in a specific angle direction. This unnecessary light has a peak in a direction of around −10 degrees and the diffraction efficiency of this peak is 0.0046%. According to the configuration of the present embodiment, since the total reflection of the light entering the grating wall surface from the side of the high refractive index medium is reduced, the unnecessary light can be decreased.

Figure 11B:
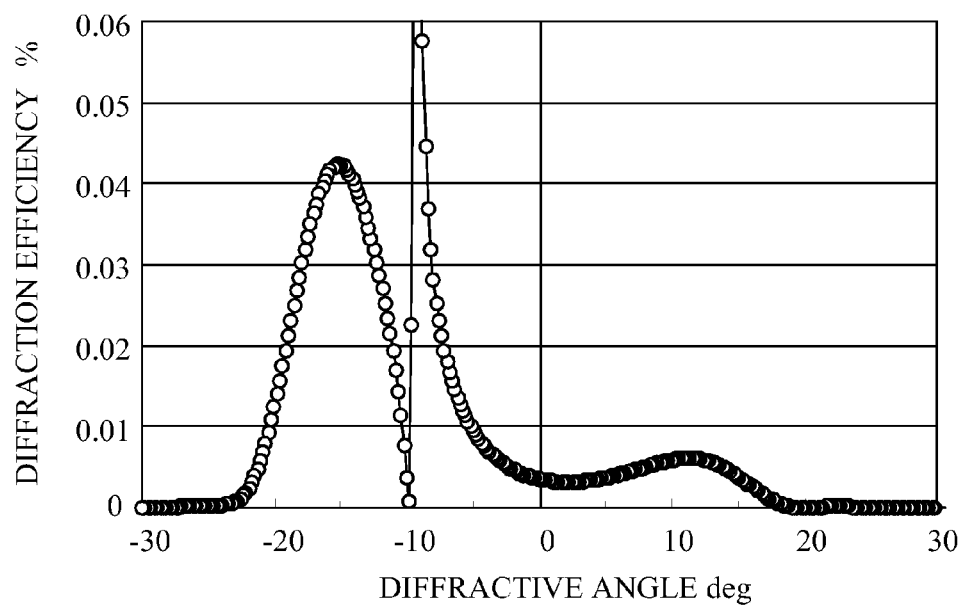

Next, light that enters the diffractive optical element 1 at an obliquely incident angle of an upward direction with reference to the designed incident angle is assumed. FIG. 11B is an RCWA calculation result on conditions that the incident angle is −10 degrees, the grating pitch is 100 μm, and the wavelength is 550 nm. The diffraction efficiency of the +1st order diffracted light that is the designed order is 96.66%. The remaining unnecessary light, as illustrated in FIG. 11B, propagates as unnecessary light which has a peak in a specific angle direction. This unnecessary light has a peak in a direction of around −15 degrees, and the diffraction efficiency of this peak is 0.042%. The unnecessary light also has a peak in a direction of around +10 degrees, and the diffraction efficiency of this peak is 0.0061%. According to the configuration of the present embodiment, since transmission of the light entering the grating wall surface from the side of the high refractive index medium is reduced, the unnecessary light can be decreased.

In the present embodiment, the light shielding member 24 is provided obliquely with respect to the grating wall surface of the second diffractive grating 12, but it is not limited to this. The light shielding member 24 may also be provided obliquely with respect to the grating wall surface of the first diffractive grating 11. In the present embodiment, the width (thickness) of the light shielding member 24 has a structure where the width at the incident side is thinner and the width at the emission side is thicker, but it is not limited to this. On the contrary, a structure where the width at the incident side is thicker and the width at the emission side is thinner may also be adopted. Even if the thickness of the light shielding member 24 is arbitrarily changed in accordance with the position of the grating wall surface, the similar effect can be obtained.

Embodiment 6

Figure 12:
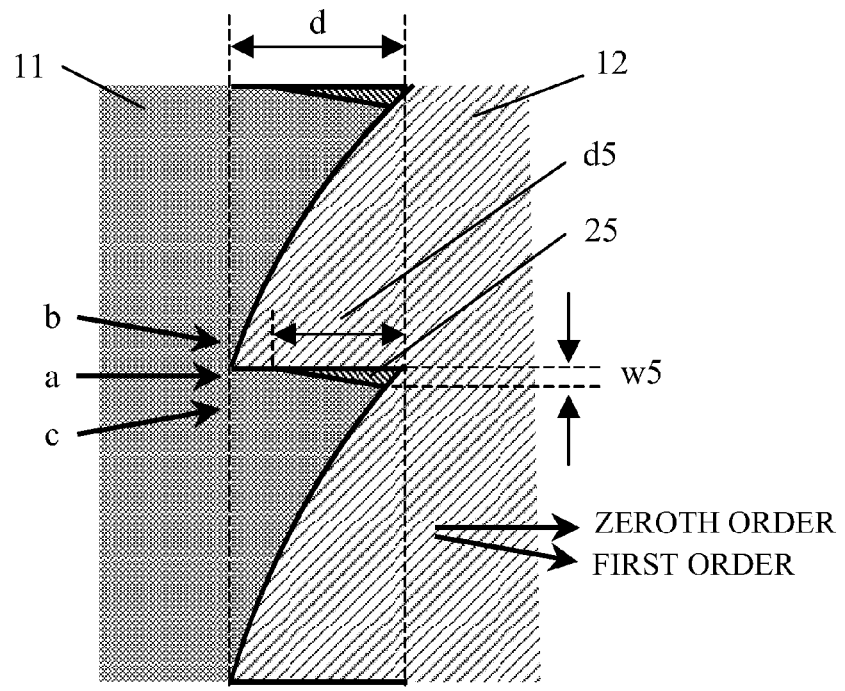
FIG. 12 is an enlarged cross-sectional diagram of a diffractive optical part in Embodiment 6.

Next, a diffractive optical element in Embodiment 6 of the present invention will be described. A light shielding member 25 of the present embodiment is configured so that the width (thickness) is gradually thicker from a predetermined position of the grating wall surface. FIG. 12 is an enlarged cross-sectional diagram of the diffractive grating in the present embodiment. The material constituting the diffractive grating, the grating height d, and the designed order are the same as those of Embodiments 4 and 5.

The light shielding member 25 of the present embodiment does not have a uniform film shape along the grating wall surface, and it has a structure in which the light shielding member becomes thicker from a position of the height d5 of the grating wall surface up to a position of the width w5. The light shielding member 25 has functions of preventing the total reflection that is generated on the grating wall surface of the m grating and of reducing the transmitted light that is generated on the grating wall surface of the m' grating. The material constituting the light shielding member 25 is an absorption material having a refractive index of n=1.55 and an extinction constant of k=0.1, and the height d5 is 6.96 μm and the width w5 is 0.2 μm.

Figure 13A:
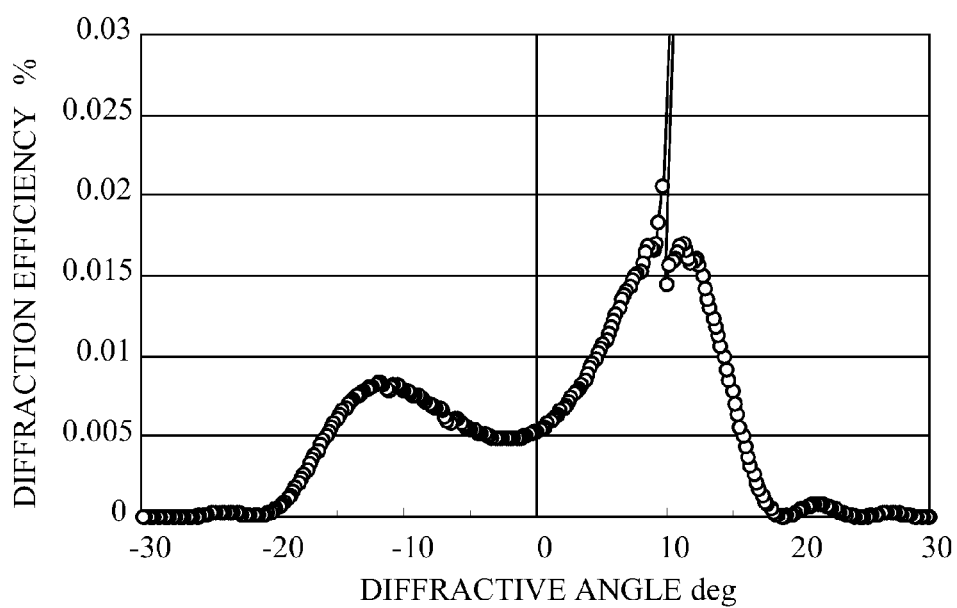
FIGS. 13A and 13B are graphs of diffraction efficiencies for light having an incident angle of ±10 degrees in the diffractive optical element of Embodiment 6.

In the embodiment, light that enters the diffractive optical element at an obliquely incident angle of a downward direction with reference to the designed incident angle is assumed. FIG. 13A is an RCWA calculation result on conditions that the incident angle is +10 degrees, the grating pitch is 100 μm, and the wavelength is 550 nm. The diffraction efficiency of the +1st order diffracted light that is the designed order is 97.36%. The remaining unnecessary light, as illustrated in FIG. 13A, propagates as unnecessary light having a peak in a specific angle direction. This unnecessary light has a peak in a direction of around −10 degrees and the diffraction efficiency of this peak is 0.0083%. According to the configuration of the present embodiment, the total reflection of the light entering the grating wall surface from the side of the high refractive index medium is reduced, and therefore the unnecessary light can be decreased.

Figure 13B:
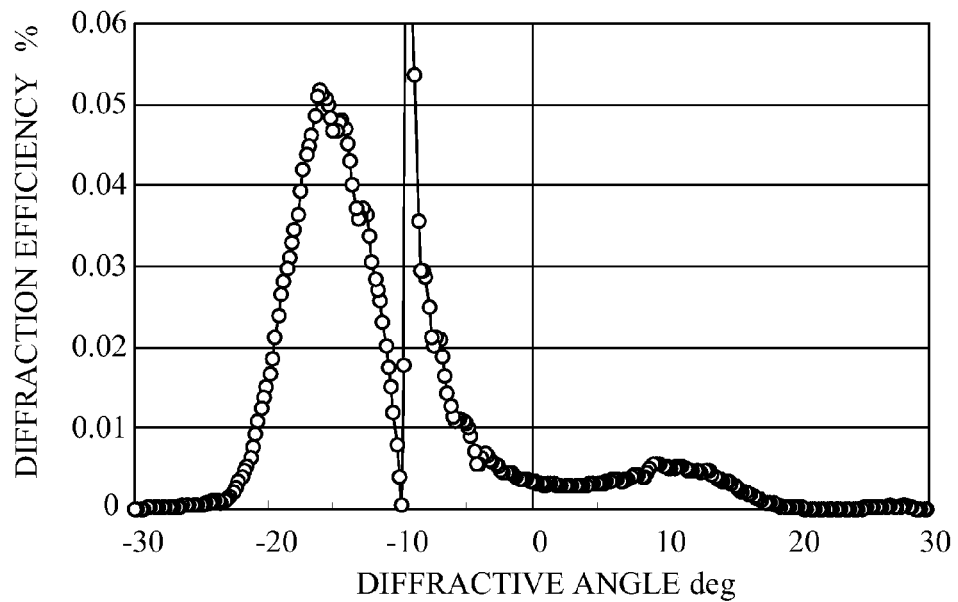

Next, light that enters the diffractive optical element 1 at an obliquely incident angle of an upward direction with reference to the designed incident angle is assumed. FIG. 13B is an RCWA calculation result on conditions that the incident angle is −10 degrees, the grating pitch is 100 μm, and the wavelength is 550 nm. The diffraction efficiency of the +1st order diffracted light that is the designed order is 96.25%. The remaining unnecessary light, as illustrated in FIG. 13B, propagates as unnecessary light which has a peak in a specific angle direction. This unnecessary light has a peak in a direction of around −15 degrees, and the diffraction efficiency of this peak is 0.052%. The unnecessary light also has a peak in a direction of around +10 degrees, and the diffraction efficiency of this peak is 0.0057%. According to the configuration of the present embodiment, the transmission of the light entering the grating wall surface from the side of the high refractive index medium is reduced, and the unnecessary light can be decreased. Additionally, a manufacturing method can be selected considering the manufacturing tolerance of the diffractive optical element, the mass productivity, the cost, or the like.

In the present embodiment, as the ratio of the height d5 of the light shielding member with respect to the grating height d is decreased, the light shielding member 25 becomes smaller. When the ratio of the thickness d5 of the light shielding member with respect to the grating height d is greater than or equal to 50%, a sufficient reduction effect of the unnecessary light can be obtained. In Embodiment 6, the light shielding member 25 is tilted with respect to the grating wall surface of the second diffractive grating 12. However, even if the light shielding member 25 is tilted with respect to the grating wall surface of the first diffractive grating 11 at the inverse side, the similar effect is obtained and the embodiment is not limited to this. In Embodiment 6, the light shielding member 25 has a structure where it is thinner at the incident side and is thicker at the emission side, but it is not limited to this and a structure where it is thicker at the incident side and is thinner at the emission side may also be adopted. Additionally, since the same effect can be obtained even if the structure where the thickness of the light shielding member 25 is arbitrarily changed in accordance with the position of the grating wall surface, the embodiment is not limited to these structures.

Embodiment 7

Next, a diffractive optical element in Embodiment 7 of the present invention will be described. In the diffractive optical element of the present embodiment, the material constituting the light shielding member and its width are different from those of Embodiments 1 and 2. The material constituting the light shielding member of the present embodiment is an absorption material having a refractive index of n=1.524 and an extinction constant of k=0.1, and the width w of the light shielding member 20 is 0.1 μm. Since other configurations of the diffractive optical element are the same as those of Embodiments 1 and 2, descriptions thereof will be omitted.

Figure 14A:
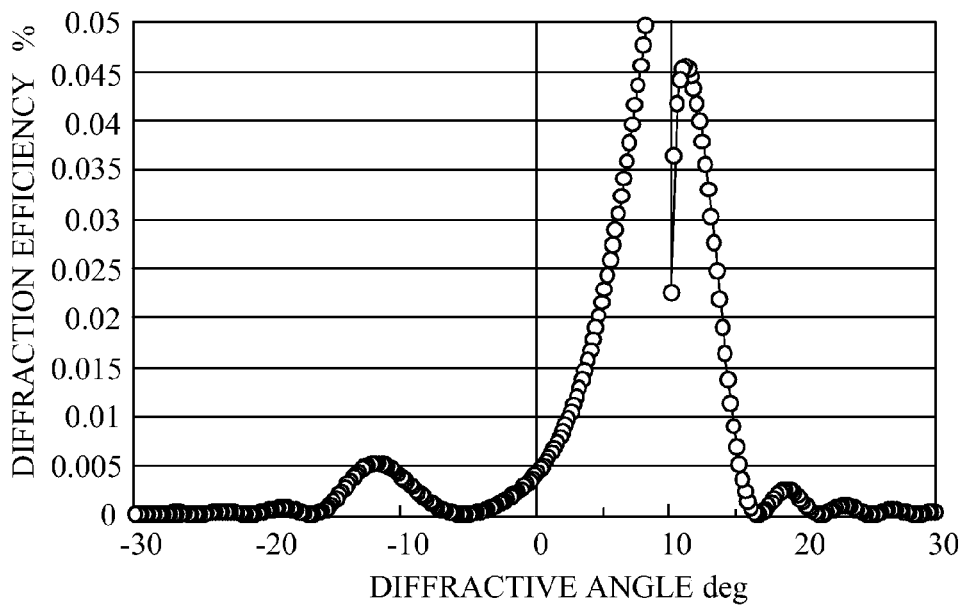
FIGS. 14A and 14B are graphs of diffraction efficiencies for light having an incident angle of ±10 degrees in the diffractive optical element of Embodiment 7.

First of all, light that enters the diffractive optical element at an obliquely incident angle of a downward direction with reference to the designed incident angle is assumed. FIG. 14A is an RCWA calculation result on conditions that the incident angle is +10 degrees, the grating pitch is 100 μm, and the wavelength is 550 nm. The diffraction efficiency of the +1st order diffracted light that is the designed order is 95.28%. The remaining unnecessary light, as illustrated in FIG. 14A, propagates as unnecessary light. The present embodiment, similarly to Embodiment 1, means that the total refection of the light entering the grating wall surface from the side of the high refractive index medium (the second diffractive grating 12 having the second refractive index) is reduced by the light shielding member having a thin film shape. As a result, the unnecessary light is significantly decreased.

Figure 14B:
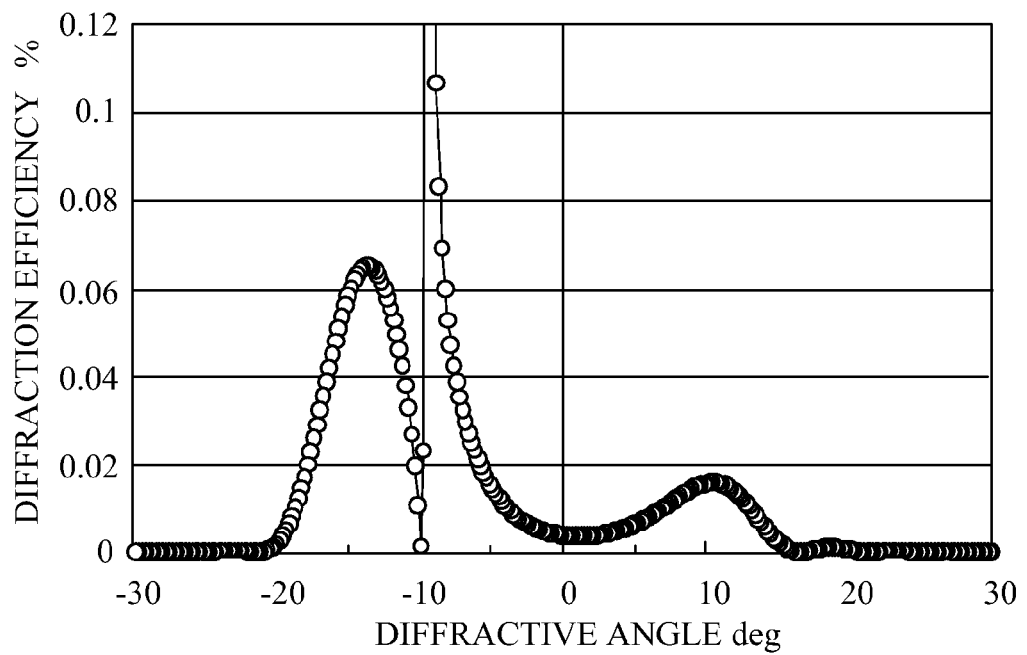

Next, light that enters the diffractive optical element 1 at an obliquely incident angle of an upward direction with reference to the designed incident angle is assumed. FIG. 14B is an RCWA calculation result on conditions that the incident angle is −10 degrees, the grating pitch is 100 μm, and the wavelength is 550 nm. The diffraction efficiency of the +1st order diffracted light that is the designed order is 95.37%. The remaining unnecessary light, as illustrated in FIG. 14B, propagates as unnecessary light which has a peak in a specific angle direction. This unnecessary light has a peak in a direction of around −14 degrees, and the diffraction efficiency of this peak is 0.069%. The unnecessary light also has a peak in a direction of around +10 degrees, and the diffraction efficiency of this peak is 0.0013%. In the present embodiment, similarly to Embodiment 1, part of light entering the grating wall surface from the side of the low refractive index medium (the first diffractive grating 11 having the first refractive index) is reduced by the light shielding member 20 having a thin film shape that is provided on the grating wall surface. As a result, the unnecessary light is decreased.

As described above, when the obliquely incident light enters the diffractive optical element of the present embodiment, the total reflection light of the light entering the grating wall surface from the side of the high refractive index medium is reduced since the light shielding member is provided on the grating wall surface. Furthermore, the transmitted light of the light entering the grating wall surface from the side of the low refractive index medium is reduced by the light shielding member. Thus, the light shielding member reduces the total reflection light and the transmitted light that are generated at an interface of the high refractive index medium and the low refractive index medium separated by the grating wall surface. According to the diffractive grating of the present embodiment, since the unnecessary light can be reduced, the unnecessary light reaching an imaging plane is reduced and the deterioration of the imaging performance can be decreased.

Figure 15:
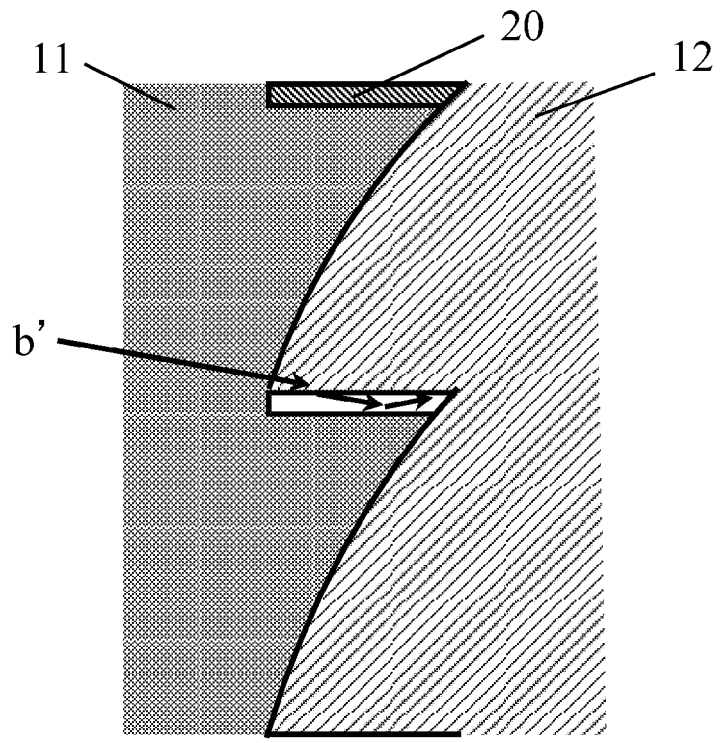
FIG. 15 is a schematic diagram illustrating a propagation of the unnecessary light for light of an off-screen incident angle of +10 degrees of the diffractive optical element in Embodiment 7.

The refractive index of the material constituting the light shielding member of the present embodiment is substantially the same as the higher refractive index (for example, the refractive index of the second diffractive grating 12) of the refractive indexes of the two diffractive gratings. Therefore, as illustrated in FIG. 15, the light that enters the grating wall surface at an obliquely incident angle of a downward direction with reference to the designed incident angle is not totally reflected similarly to a comparative example, and it enters the inside of the light shielding member. As a result, the light is further absorbed inside the light shielding member, and the unnecessary light is extremely reduced. Moreover, the refractive index of the material constituting the light shielding member is higher than the lower refractive index (for example, the refractive index of the first diffractive grating 11) of the refractive indexes of the two diffractive gratings. Therefore, the light entering the inside of the light shielding member is totally reflected at the interface of the lower refractive index and the light shielding member and the light remains inside the light shielding member again, and therefore the light entering the grating wall surface can be efficiently absorbed.

Embodiment 8

Next, a diffractive optical element in Embodiment 8 of the present invention will be described. In the diffractive optical element of the present embodiment, the material constituting the light shielding member and its width are different from those of Embodiments 1, 2 and 7. The material constituting the light shielding member of the present embodiment is an absorption material having a refractive index of n=1.6 and an extinction constant of k=0.1, and the width w of the light shielding member 20 is 0.1 μm. Since other configurations of the diffractive optical element are the same as those of Embodiments 1 and 2, descriptions thereof will be omitted.

Figure 16A:
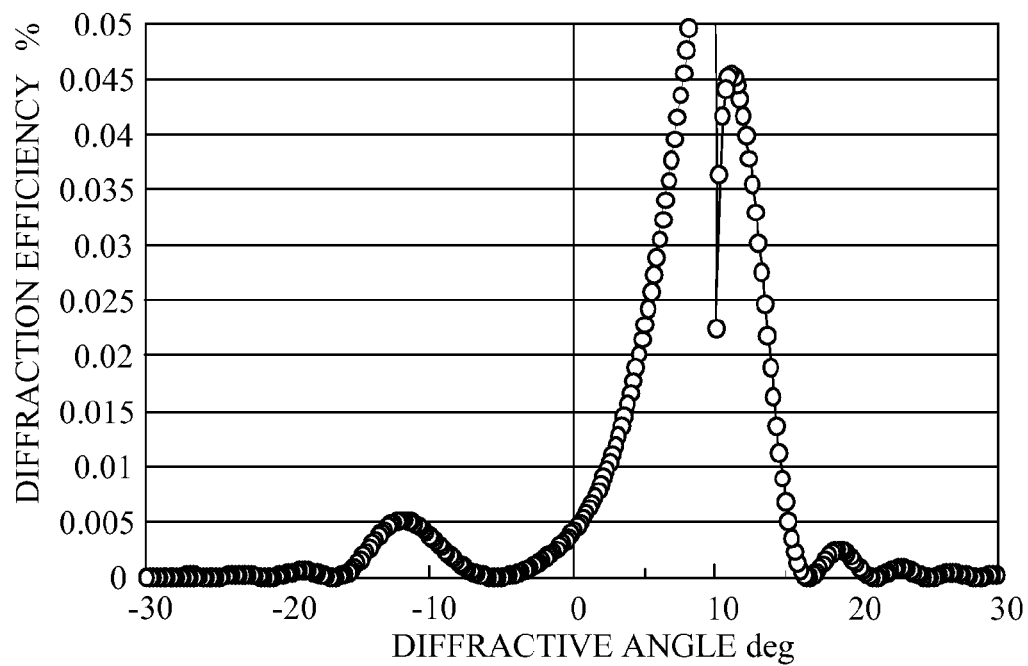
FIGS. 16A and 16B are graphs of diffraction efficiencies for light having an incident angle of ±10 degrees in the diffractive optical element of Embodiment 8.

First of all, light that enters the diffractive optical element at an obliquely incident angle of a downward direction with reference to the designed incident angle is assumed. FIG. 16A is an RCWA calculation result on conditions that the incident angle is +10 degrees, the grating pitch is 100 μm, and the wavelength is 550 nm. The diffraction efficiency of the +1st order diffracted light that is the designed order is 95.39%. The remaining unnecessary light, as illustrated in FIG. 16A, propagates as unnecessary light having a peak in a specific angle direction. This unnecessary light has a peak in a direction of around −10 degrees, and the diffraction efficiency of this peak is 0.0055%. The present embodiment, similarly to Embodiment 1, means that the total refection of the light entering the grating wall surface from the side of the high refractive index medium (the second diffractive grating 12 having the second refractive index) is reduced by the light shielding member having a thin film shape that is provided on the grating wall surface. As a result, the unnecessary light is significantly decreased.

Figure 16B:
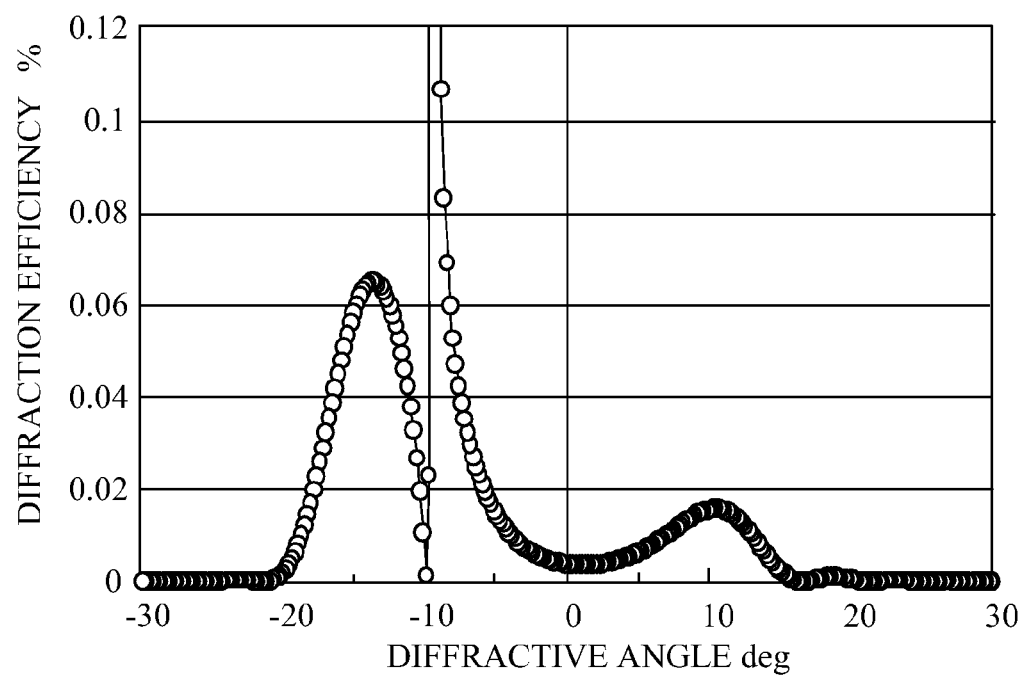

Next, light that enters the diffractive optical element 1 at an obliquely incident angle of an upward direction with reference to the designed incident angle is assumed. FIG. 16B is an RCWA calculation result on conditions that the incident angle is −10 degrees, the grating pitch is 100 μm, and the wavelength is 550 nm. The diffraction efficiency of the +1st order diffracted light that is the designed order is 91.15%. The remaining unnecessary light, as illustrated in FIG. 16B, propagates as unnecessary light which has a peak in a specific angle direction. This unnecessary light has a peak in a direction of around −13 degrees, and the diffraction efficiency of this peak is 0.065%. The unnecessary light also has a peak in a direction of around +10 degrees, and the diffraction efficiency of this peak is 0.016%. In the present embodiment, similarly to Embodiment 1, part of light entering the grating wall surface from the side of the low refractive index medium (the first diffractive grating 11 having the first refractive index) is reduced by the light shielding member 20 having a thin film shape that is provided on the grating wall surface. As a result, the unnecessary light is decreased.

As described above, when the obliquely incident light enters the diffractive optical element of the present embodiment, the total reflection light of the light entering the grating wall surface from the side of the high refractive index medium is reduced since the light shielding member is provided on the grating wall surface. Furthermore, the transmitted light of the light entering the grating wall surface from the side of the low refractive index medium is reduced by the light shielding member. Thus, the light shielding member reduces the total reflection light and the transmitted light that are generated at an interface of the high refractive index medium and the low refractive index medium separated by the grating wall surface. According to the diffractive grating of the present embodiment, since the unnecessary light can be reduced, the unnecessary light reaching an imaging plane is reduced and the deterioration of the imaging performance can be decreased.

The refractive index of the material constituting the light shielding member of the present embodiment is higher than the higher refractive index (for example, the refractive index of the second diffractive grating 12) of the refractive indexes of the two diffractive gratings. Therefore, similarly to FIG. 15 of Embodiment 7, the light that enters the grating wall surface at an obliquely incident angle of a downward direction with reference to the designed incident angle is not totally reflected similarly to a comparative example, and it enters the inside of the light shielding member. As a result, the light is further absorbed inside the light shielding member, and the unnecessary light is extremely reduced. Moreover, the refractive index of the material constituting the light shielding member is higher than the lower refractive index (for example, the refractive index of the first diffractive grating 11) of the refractive indexes of the two diffractive gratings. Therefore, the light entering the inside of the light shielding member is totally reflected at the interface of the lower refractive index and the light shielding member and the light remains inside the light shielding member again. In other words, the two diffractive gratings and the light shielding member have a relation of a waveguide structure, and therefore the light entering the grating wall surface can be efficiently absorbed.

Embodiment 9

Next, a diffractive optical element in Embodiment 9 of the present invention will be described. In the diffractive optical element of the present embodiment, the material constituting the light shielding member and its width are different from those of Embodiments 1, 2, 7, and 8. The material constituting the light shielding member of the present embodiment is an absorption material having a refractive index of n=1.65 and an extinction constant of k=0.1, and the width w of the light shielding member 20 is 0.1 μm. Since other configurations of the diffractive optical element are the same as those of Embodiments 1 and 2, descriptions thereof will be omitted.

Figure 17A:
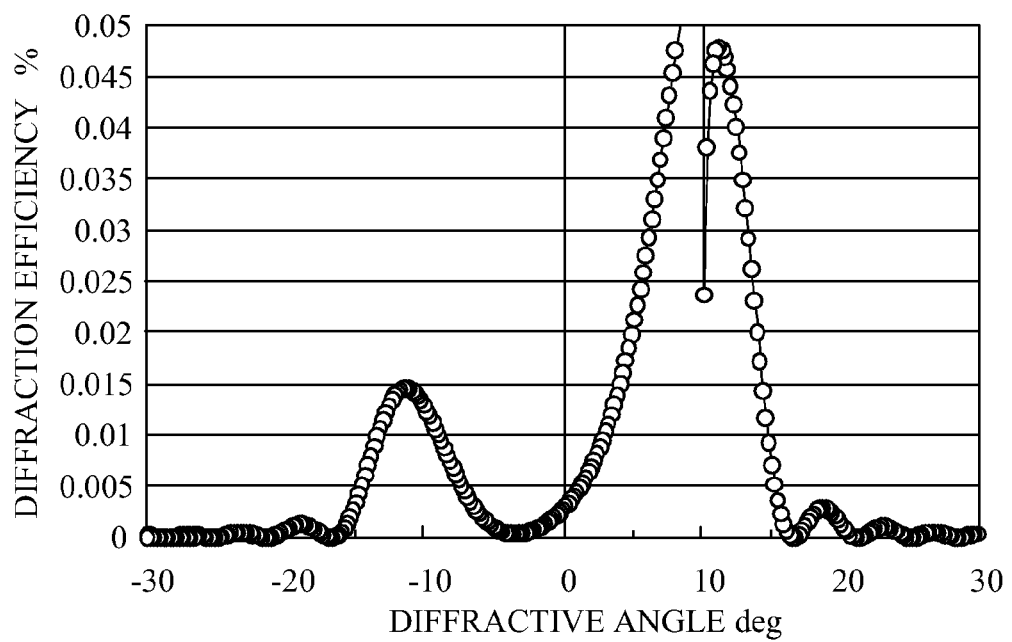
FIGS. 17A and 17B are graphs of diffraction efficiencies for light having an incident angle of ±10 degrees in the diffractive optical element of Embodiment 9.

First of all, light that enters the diffractive optical element at an obliquely incident angle of a downward direction with reference to the designed incident angle is assumed. FIG. 17A is an RCWA calculation result on conditions that the incident angle is +10 degrees, the grating pitch is 100 μm, and the wavelength is 550 nm. The diffraction efficiency of the +1st order diffracted light that is the designed order is 95.31%. The remaining unnecessary light, as illustrated in FIG. 17A, propagates as unnecessary light having a peak in a specific angle direction. This unnecessary light has a peak in a direction of around −10 degrees, and the diffraction efficiency of this peak is 0.015%. The present embodiment, similarly to Embodiment 1, means that the total refection of the light entering the grating wall surface from the side of the high refractive index medium (the second diffractive grating 12 having the second refractive index) is reduced by the light shielding member having a thin film shape that is provided on the grating wall surface. As a result, the unnecessary light is significantly decreased.

Figure 17B:
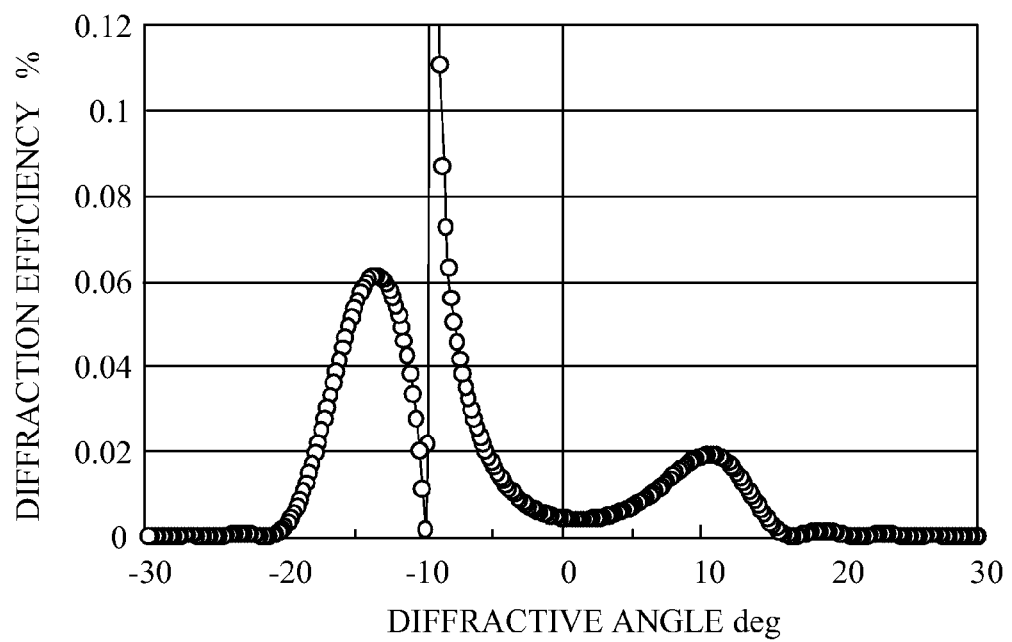

Next, light that enters the diffractive optical element 1 at an obliquely incident angle of an upward direction with reference to the designed incident angle is assumed. FIG. 17B is an RCWA calculation result on conditions that the incident angle is −10 degrees, the grating pitch is 100 μm, and the wavelength is 550 nm. The diffraction efficiency of the +1st order diffracted light that is the designed order is 95.06%. The remaining unnecessary light, as illustrated in FIG. 17B, propagates as unnecessary light which has a peak in a specific angle direction. This unnecessary light has a peak in a direction of around −13 degrees, and the diffraction efficiency of this peak is 0.061%. The unnecessary light also has a peak in a direction of around +10 degrees, and the diffraction efficiency of this peak is 0.019%. In the present embodiment, similarly to Embodiment 1, part of light entering the grating wall surface from the side of the low refractive index medium (the first diffractive grating 11 having the first refractive index) is reduced by the light shielding member 20 having a thin film shape that is provided on the grating wall surface. As a result, the unnecessary light is decreased.

As described above, when the obliquely incident light enters the diffractive optical element of the present embodiment, the total reflection light of the light entering the grating wall surface from the side of the high refractive index medium is reduced since the light shielding member is provided on the grating wall surface. Furthermore, the transmitted light of the light entering the grating wall surface from the side of the low refractive index medium is reduced by the light shielding member. Thus, the light shielding member reduces the total reflection light and the transmitted light that are generated at an interface of the high refractive index medium and the low refractive index medium separated by the grating wall surface. According to the diffractive grating of the present embodiment, since the unnecessary light can be reduced, the unnecessary light reaching an imaging plane is reduced and the deterioration of the imaging performance can be decreased.

The refractive index of the material constituting the light shielding member of the present embodiment is higher than the higher refractive index (for example, the refractive index of the second diffractive grating 12) of the refractive indexes of the two diffractive gratings. Therefore, similarly to Embodiment 8, the light entering the grating wall surface can be efficiently absorbed.

In accordance with Embodiments 7 to 9, it is preferable that the relation between a refractive index nd3 of the light shielding member and a refractive index nd2 of the diffractive grating meets the following Expression (3), where nd3 is a refractive index of the light shielding member for d-line, and nd2 is the higher refractive index of the refractive indexes of the two diffractive gratings.

$$|nd3-nd2|<0.2 \qquad (3)$$

When this relation is not met, it is not preferable because the reflection at the interface of the diffractive grating having the higher refractive index of the two diffractive gratings and the light shielding member is large and the absorption in the light shielding member is difficult.

With referring to Table 1, Embodiments 1 to 9 described above will be described. Table 1 indicates materials of the first diffractive gratings that are used as the diffractive optical elements of Embodiments 1 to 9, refractive indexes nd1 of the materials for the d-line, the Abbe's numbers vd1, partial dispersion ratios θgF1, and refractive indexes n1_550 for wavelength of 550 nm. Table 1 also indicates materials of the second diffractive gratings, refractive indexes nd2 of the materials for the d-line, the Abbe's numbers vd2, partial dispersion ratios θgF2, and refractive indexes nd2_550 for wavelength of 550 nm. Furthermore, it indicates grating heights d of the diffractive optical elements of Embodiments 1 to 6, refractive indexes of materials that constitute the light shielding members, extinction coefficients, and film shapes of the light shielding members.

TABLE 1

|  | EMBODIMENT | | | | | | | | |
| --- | --- | --- | --- | --- | --- | --- | --- | --- | --- |
|  | 1 | 2 | 3 | 4 | 5 | 6 | 7 | 8 | 9 |
| nd1 | 1.479 | 1.479 | 1.479 | 1.504 | 1.504 | 1.504 | 1.479 | 1.479 | 1.479 |
| vd1 | 20.7 | 20.7 | 20.7 | 16.3 | 16.3 | 16.3 | 20.7 | 20.7 | 20.7 |
| θgF1 | 0.404 | 0.404 | 0.404 | 0.39 | 0.39 | 0.39 | 0.404 | 0.404 | 0.404 |
| nd1_550 | 1.483 | 1.483 | 1.483 | 1.511 | 1.511 | 1.511 | 1.483 | 1.483 | 1.483 |
| nd2 | 1.522 | 1.522 | 1.522 | 1.567 | 1.567 | 1.567 | 1.522 | 1.522 | 1.522 |
| vd2 | 51.3 | 51.3 | 51.3 | 47 | 47 | 47 | 51.3 | 51.3 | 51.3 |
| nd2_550 | 1.524 | 1.524 | 1.524 | 1.57 | 1.57 | 1.57 | 1.524 | 1.524 | 1.524 |
| GRATING THICKNESS d (μm) | 13.51 | 13.51 | 13.51 | 9.29 | 9.29 | 9.29 | 13.51 | 13.51 | 13.51 |
| SHAPE OF LIGHT SHIELDING MEMBER | FILM SHAPE | FILM SHAPE | THREE-LAYER FILM SHAPE | FILM SHAPE | THICKER FROM GRATING APEX | THICKENED FROM GRATING WALL SURFACE | FILM SHAPE | FILM SHAPE | FILM SHAPE |
| REFRACTIVE INDEX OF LIGHT SHIELDING MEMBER | 1.5 | 1.5 | 1.55 1.4 1.53 | 1.55 | 1.55 | 1.55 | 1.524 | 1.6 | 1.65 |
| EXTINCTION COEFFICIENT OF LIGHT SHIELDING MEMBER | 0.1 | 0.01 | 0.03 0.09 0.03 | 0.1 | 0.1 | 0.1 | 0.1 | 0.1 | 0.1 |
| WIDTH OF LIGHT SHIELDING MEMBER w (μm) | 0.2 | 2 | 0.2 0.25 0.15 | 0.2 | 0.2 | 0.2 | 0.1 | 0.1 | 0.1 |
| THICKNESS OF LIGHT SHIELDING MEMBER d (μm) | 13.51 | 13.51 | 13.51 | 9.29 | 9.29 | 6.96 | 13.51 | 13.51 | 13.51 |

Referring to Table 1, it is preferable that an extinction coefficient k of the material constituting the light shielding member is larger than 0.001 and is smaller than 0.5. Furthermore, in order to improve the effect of the light shielding member, the extinction coefficient k of the material constituting the light shielding member is larger than 0.005 and is smaller than 0.3. It is preferable that the refractive index of the material constituting the light shielding member is higher than that of the material having the lower refractive index of the materials constituting the diffractive grating. It is preferable that an absolute value of the difference between the refractive index of the material constituting the light shielding member and the refractive index of the material having the higher refractive index of the materials constituting the diffractive grating is smaller than 0.2. The light shielding member may have a film shape of a uniform thickness on the grating wall surface or may have a structure in which it is thicker from the apex of the diffractive grating or it is thicker from the middle position of the wall surface portion. It is preferable that it is formed on a whole region of the grating wall surface since it has a large effect.

When the width of the light shielding member is wider, a mismatched region of the phases of the first diffractive grating and the second diffractive grating is expanded and the diffraction efficiency of the unnecessary diffracted light having comparative low orders is increased, and therefore the diffraction efficiency of the designed order is decreased. When the width of this thin film is wider, the imaging performance is considerably decreased. Therefore, it is preferable that the relation between a width W of whole of the light shielding member and a grating pitch P meets the following Expression (4).

$$W/P<0.07 \qquad (4)$$

The width W of whole of the light shielding member is a sum of each thin film when a multilayered film is adopted as described in Embodiment 3, and is a width at the widest part when a thicker layer is adopted as described in Embodiments 5 and 6. It is preferable that the left-hand side of Expression (4) is smaller than 0.03 because the mismatched region of the phases of the first diffractive grating and the second diffractive grating is small.

Embodiment 10

Figure 18:
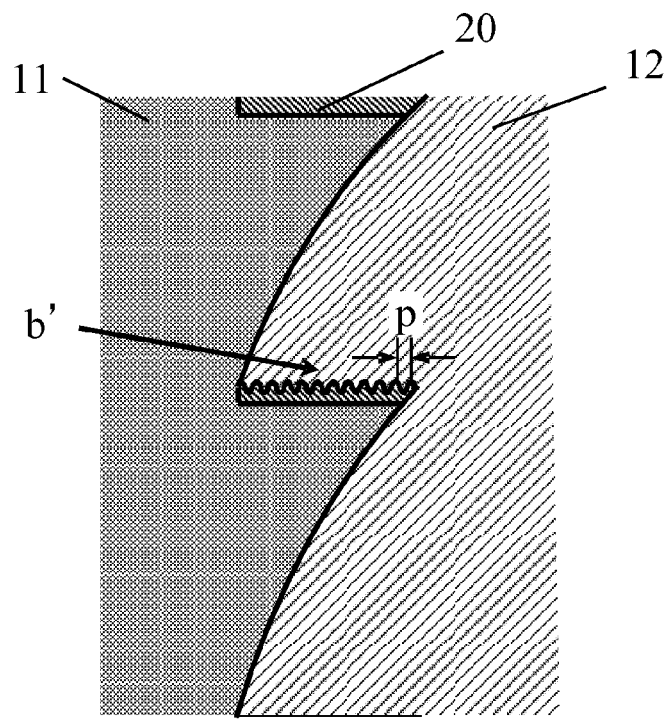
FIG. 18 is a schematic diagram illustrating a propagation of the unnecessary light for light of an off-screen incident angle of +10 degrees of the diffractive optical element in Embodiment 10.

Next, a diffractive optical element in Embodiment 10 of the present invention will be described. The present embodiment is different from each embodiment described above in that the shape of the interface of the light shielding member and the grating wall surface is different. FIG. 18 is an enlarged cross-sectional diagram of a diffractive grating in the present embodiment. As illustrated in FIG. 18, in the present embodiment, the shape of the interface between the grating (the second diffractive grating 12) having the higher refractive index of the two diffractive gratings and the light shielding member is a fine concavo-convex shape whose size is less than or equal to a wavelength. The light shielding member can use the material or the structure of any one of the embodiments described above, and for example a single film shape is illustrated in FIG. 18.

The fine concavo-convex shape having the size less than or equal to the wavelength functions as a medium in which a refractive index is continuously changed, and in particular, an extinction coefficient is also changed continuously. Since the reflection at the interfaces having different extinction coefficients can also be reduced, the interface reflection between the grating having the higher refractive index (the second diffractive grating 12) of the two diffractive gratings and the light shielding member can be reduced. Thus, since the light entering the grating wall surface at an obliquely incident angle in a downward direction with reference to the designed incident angle enters the inside of the light shielding member without reflecting at the interface, the light entering the grating wall surface can be efficiently absorbed.

It is preferable that a pitch p of the fine concavo-convex shape is designed so as not to generate the 1st reflected/diffracted light. Therefore, the relation of a refractive index n2 for the minimum wavelength in a use wavelength range of the grating having the higher refractive index of the two diffractive gratings, a diffraction angle θ2 of the 1st reflected/diffracted light, an incident angle θ1, and the minimum wavelength λ in the use wavelength range is represented by the following expression.

$$n2(\sin\theta2+\sin\theta1)=\lambda/p$$

This expression is modified as follows.

$$\sin\theta2=\lambda/(n2\times p)-\sin\theta1$$

The reflected/diffracted light is set so as not to be diffracted in a direction of the second diffractive grating (an emission side direction), and the following expression is obtained when an approximation is performed assuming the incident angle of off-screen light as sin θ1 (the incident angle is +10 degrees, but the incident angle with respect to the fine concavo-convex shape is +80 degrees).

$$\lambda/n2\times p-0.98<0$$

As a result, it is preferable that the pitch p of the fine concavo-convex shape meets the following Expression (5).

$$p<0.98\times\lambda/n2 \quad (5)$$

Since the use wavelength range of the present embodiment is a visible wavelength range, the minimum wavelength λ of the use wavelength range is 400 nm. The pitch p of the fine concavo-convex shape does not have to be uniform in a whole of the grating wall surface, and it may also be different.

In the present embodiment, a method of manufacturing the fine concavo-convex shape is not particularly limited. As one example, there is a method of molding the diffractive grating using a mold provided with a fine concavo-convex portion on the grating wall surface portion when manufacturing the second diffractive grating 12. A fine concavo-convex process of the grating wall surface portion may also be performed after manufacturing the second diffractive grating 12 without a fine concavo-convex structure. The structure can be obtained by manufacturing the second diffractive grating 12 which is provided with the fine concavo-convex shape on the grating wall surface and then forming the light shielding member only on the grating wall surface using the method described above.

Figure 19:
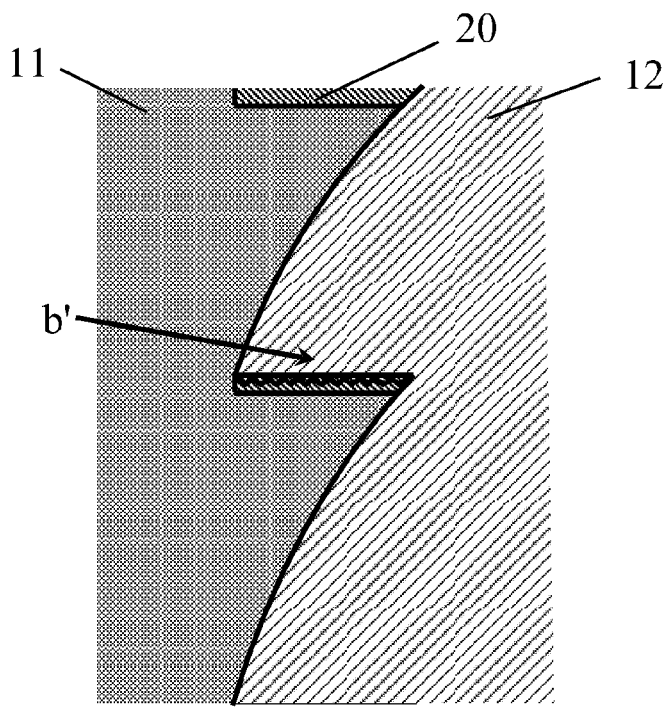
FIG. 19 is a schematic diagram illustrating a propagation of the unnecessary light for light of an off-screen incident angle of +10 degrees of the diffractive optical element in Embodiment 10.

As illustrated in FIG. 19, even when the medium between the grating having the higher refractive index (the second diffractive grating 12) of the two diffractive gratings and the light shielding member has the fine concavo-convex shape whose size is less than or equal to the wavelength, the interface reflection can be reduced. The medium having the fine concavo-convex shape in this case can be formed by a method of a selective evaporation in an oblique direction, a selective evaporation using a mask pattern, a direct formation using an ink jet process, a selective formation using a sacrifice layer, or the like.

As the diffractive optical elements of Embodiments 1 to 10, an adhesion double-layer DOE that is configured by adhesively disposing two diffractive gratings and appropriately designing the material constituting each diffractive grating and the height of the diffractive grating is used. However, the embodiments are not limited to this, and it can also be applied to a multilayer DOE that is configured by further laminating a diffractive grating.

The light shielding member of the diffractive optical element can be changed from the center region to the peripheral region to obtain the optimal diffractive optical element. In each of the embodiments described above, in addition to providing the light shielding member on the grating wall surface, the diffractive optical element can also be used by the combination of setting the designed order to an order other than +1st order, shifting the angle of the grating wall surface, forming the grating wall surface shape to be a step shape, and the like.

Comparative Example 1

Hereinafter, a diffractive optical element as Comparative example 1 with respect to Embodiments 1 to 3 and 7 to 9 will be described. In the diffractive optical element as Comparative example 1, the material of the diffractive grating and the grating height are the same as those of Embodiments 1 to 3, and an unnecessary light reduction portion is not provided on the grating wall surface.

Figure 22A:
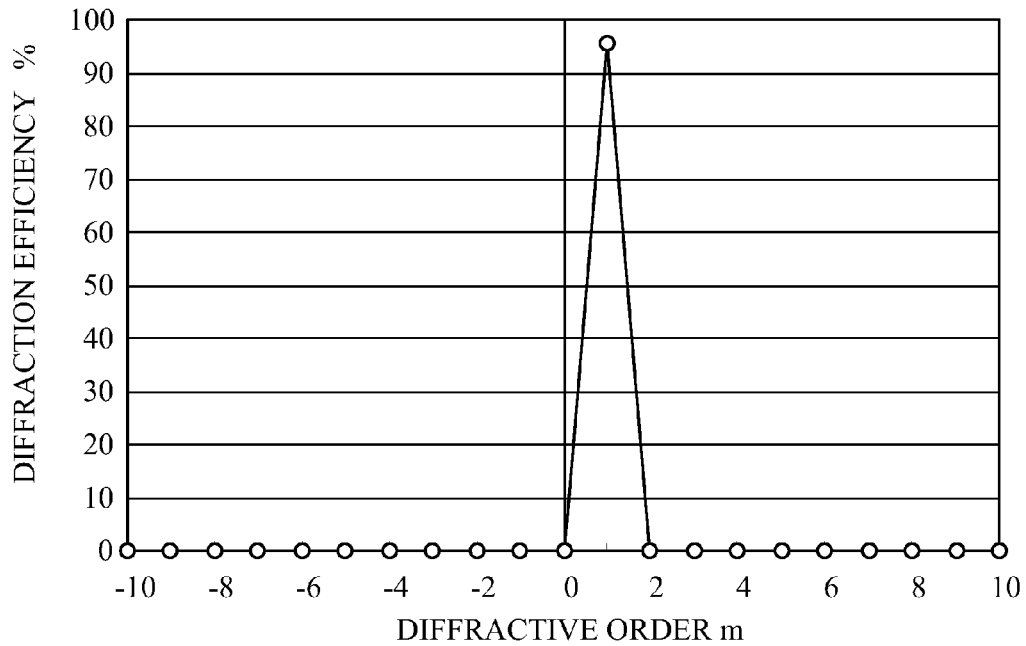
FIGS. 22A and 22B are graphs of diffraction efficiencies for light having an incident angle of +10 degrees of the diffractive optical element in Comparative example 1.
Figure 22B:
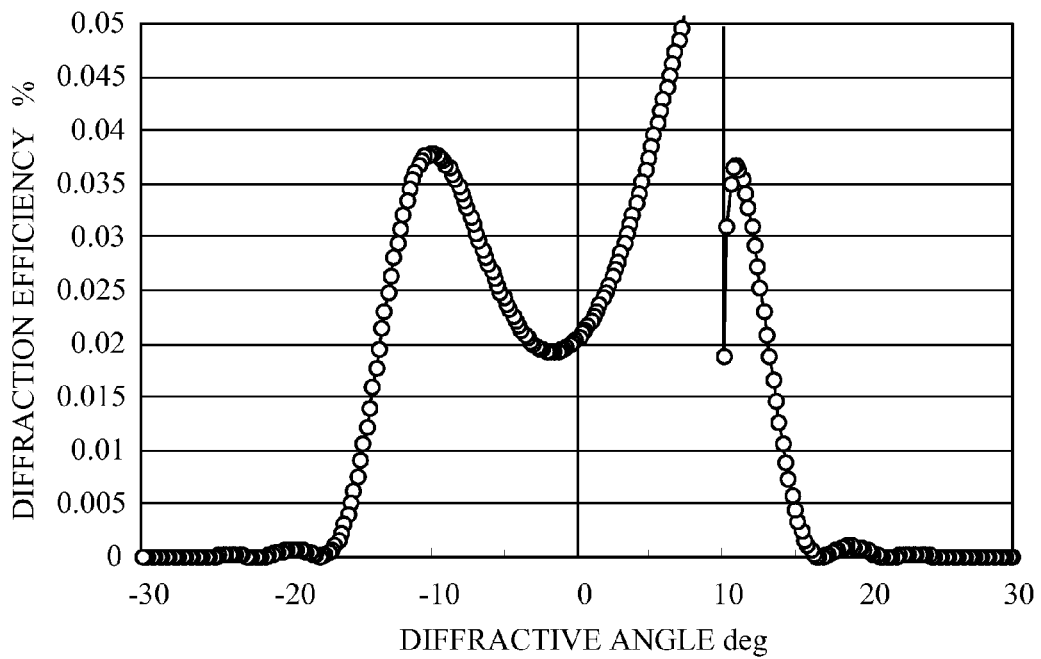

Next, considering light that enters the diffractive optical element at an oblique incident angle of a downward direction with reference to the designed incident angle, FIGS. 22A and 22B illustrate the RCWA calculation result on conditions that the incident angle is +10 degrees, the grating pitch is 100 μm, and the wavelength is 550 nm. FIG. 22A is a diffraction efficiency near the +1st order diffracted light that is the designed order. FIG. 24B is a result of enlarging a part where the diffraction efficiency indicated by a vertical axis of FIG.

Figure 23:
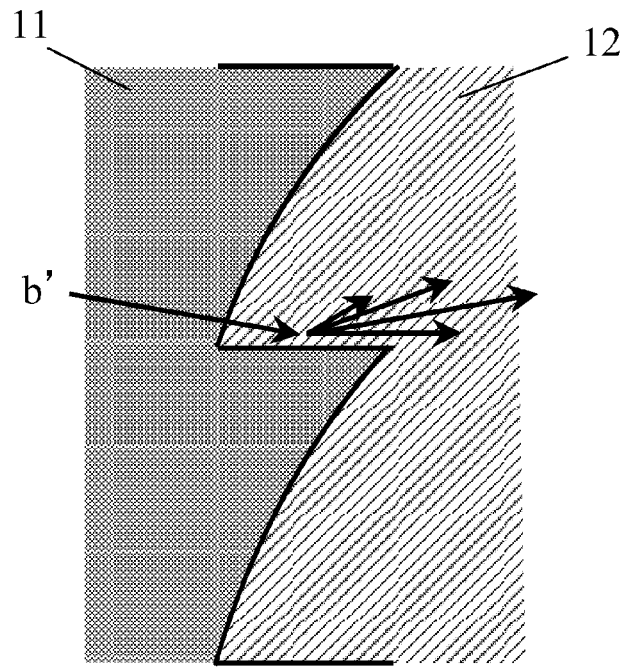
FIG. 23 is a schematic diagram illustrating a propagation of the unnecessary light for light of an off-screen incident angle of +10 degrees of the diffractive optical element in Comparative example 1.

22A is small and of changing the lateral axis from the diffractive order to a diffractive angle to illustrate a high diffractive angle range. As illustrated in FIG. 22A, the diffraction efficiency of the +1st order diffracted light that is the designed order is concentrated, and the diffraction efficiency is 95.62%, which is decreased from 100% since the angle is inclined from 0 degree that is the designed incident angle. The remaining unnecessary light, as illustrated in FIG. 22B, propagates as unnecessary light that has a peak in a specific angle direction. This unnecessary light has a peak in a direction of around −10 degrees, and the diffraction efficiency of this peak is 0.038%. This propagation direction is substantially equal to an emission direction of −10 degrees in which a component of the light having an off-screen incident angle of +10 degrees that enters the grating wall surface is totally reflected to be propagated. Since it enters the grating wall surface from the side of the high refractive index material to the side of the low refractive index material at an angle of +80 degrees that is larger than a critical angle of 76.7 degrees, the total reflection is generated. This unnecessary light is expanded from the peak in a direction of around −10 degrees to a high angle range. As illustrated in FIG. 23, this phenomenon may be caused by the fact that a component b' of the incident light entering the vicinity of the grating wall surface is totally reflected on the grating wall surface to propagate in a direction of −10 degrees and further the unnecessary light is expanded around an emission direction of the total reflection. Since the diffracted light of this unnecessary light reaches the imaging plane, the imaging performance is deteriorated.

Figure 24A:
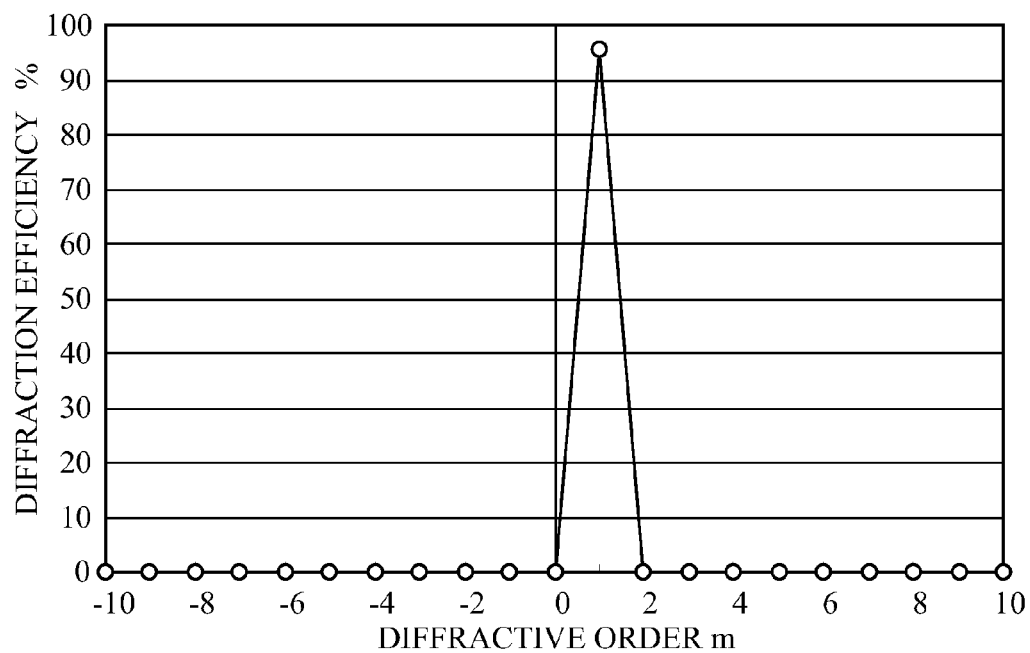
FIGS. 24A and 24B are graphs of diffraction efficiencies for light having an incident angle of −10 degrees of the diffractive optical element in Comparative example 1.
Figure 24B:
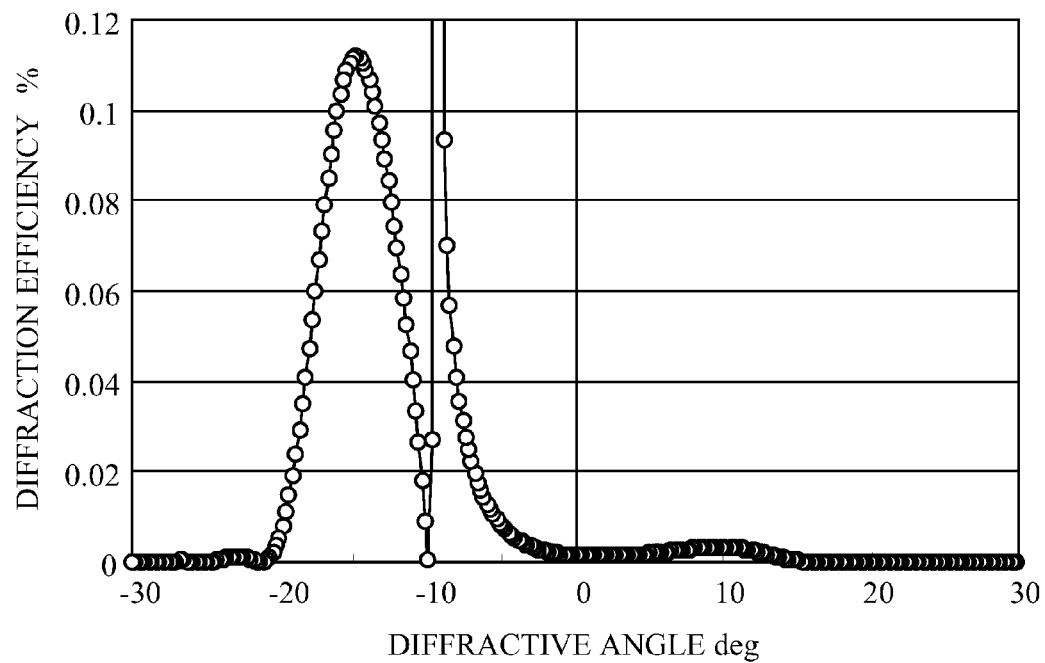
Figure 25:
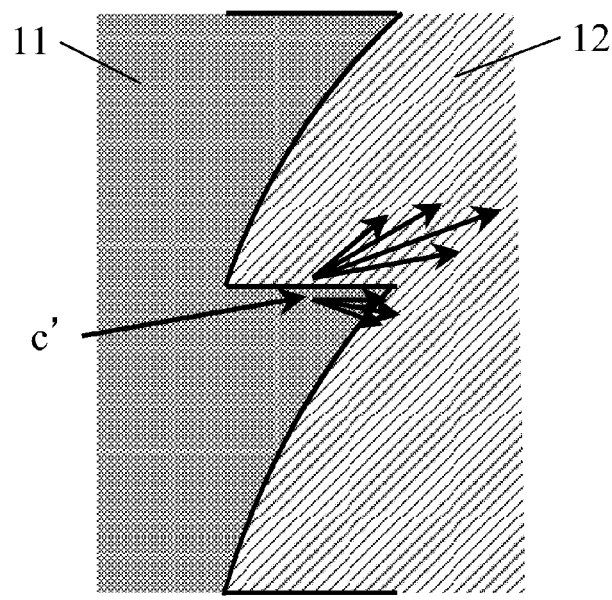
FIG. 25 is a schematic diagram illustrating a propagation of the unnecessary light for light of an off-screen incident angle of −10 degrees of the diffractive optical element in Comparative example 1.

Next, considering light that enters the diffractive optical element at an oblique incident angle of an upward direction with reference to the designed incident angle, FIGS. 24A and 24B illustrate the RCWA calculation result on conditions that the incident angle is −10 degrees, the grating pitch is 100 μm, and the wavelength is 550 nm. FIG. 24A is a diffraction efficiency near the +1st order diffracted light that is the designed order. A lateral axis indicates the diffractive order, and a vertical axis indicates the diffraction efficiency. FIG. 24B is a result of enlarging a part where the diffraction efficiency indicated by the vertical axis of FIG. 24A is small and of changing the lateral axis from the diffractive order to a diffractive angle to illustrate a high diffractive angle range. As illustrated in FIG. 24A, the diffraction efficiency of the +1st order diffracted light that is the designed order is concentrated, and the diffraction efficiency is 95.48%, which is decreased from 100% since the angle is inclined from 0 degree that is the designed incident angle. The remaining unnecessary light, as illustrated in FIG. 24B, propagates as unnecessary light that has a peak in a specific angle direction. This unnecessary light has a peak in a direction of around −15 degrees, and the diffraction efficiency of this peak is 0.112%. The unnecessary light also has a small peak in a direction of around +10 degrees, and the diffracted efficiency of this peak is 0.0033%. This propagation direction is substantially equal to an emission direction of −16.6 degrees of the transmitted light and an emission direction of +9.5 degrees of the reflected light of the light having an off-screen incident angle of −10 degrees that enters the grating wall surface. Since it enters the grating wall surface from the side of the low refractive index material to the side of the high refractive index material at an angle of +80 degrees, the transmittance of the transmitted light is 94% and the reflectance of the reflected light is 6%, which corresponds to the fact that the peak in the direction of around −15 degrees is large and the peak in the direction of around +10 degrees is small. This unnecessary light is also expanded from the peaks to a high angle range. Thus, as illustrated in FIG. 25, a component c' of the incident light that enters the vicinity of the grating wall surface may be separated into the transmitted light and the reflected light on the grating wall surface, and further they may be expanded around each peak to be propagated. In particular, the diffracted light of the unnecessary light caused by the transmitted light is large, and the imaging performance is deteriorated since this unnecessary light reaches the imaging plane.

Figure 26:
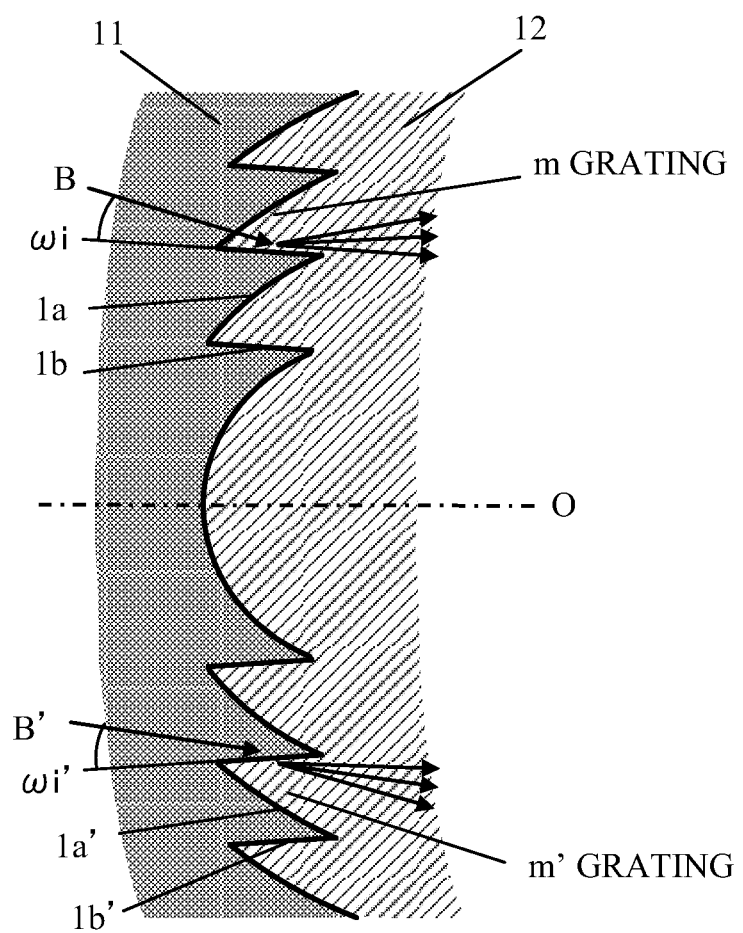
FIG. 26 is a schematic diagram illustrating a relationship between a structure of the diffractive optical element and off-screen incident light in the comparative example.

When the light of the off-screen incident angle of around 10 degrees enters the optical system in which the diffractive optical element as the comparative example is applied, the unnecessary light caused by the total reflection on the grating wall surface is generated for the m grating and the unnecessary light caused by the transmitted light on the grating wall surface is generated for the m' grating as illustrated in FIG. 26. These cause the deterioration of the imaging performance. When the diffractive optical element and the optical system are actually assembled to be used, the unnecessary light reaches the imaging plane and the deterioration of the imaging performance was confirmed.

Comparative Example 2

Hereinafter, a diffractive optical element as Comparative example 2 with respect to Embodiments 4 to 6 will be described. In the diffractive optical element as Comparative example 2, the material of the diffractive grating and the grating height are the same as those of Embodiments 4 to 6, and an unnecessary light reduction portion is not provided on the grating wall surface.

Figure 27:
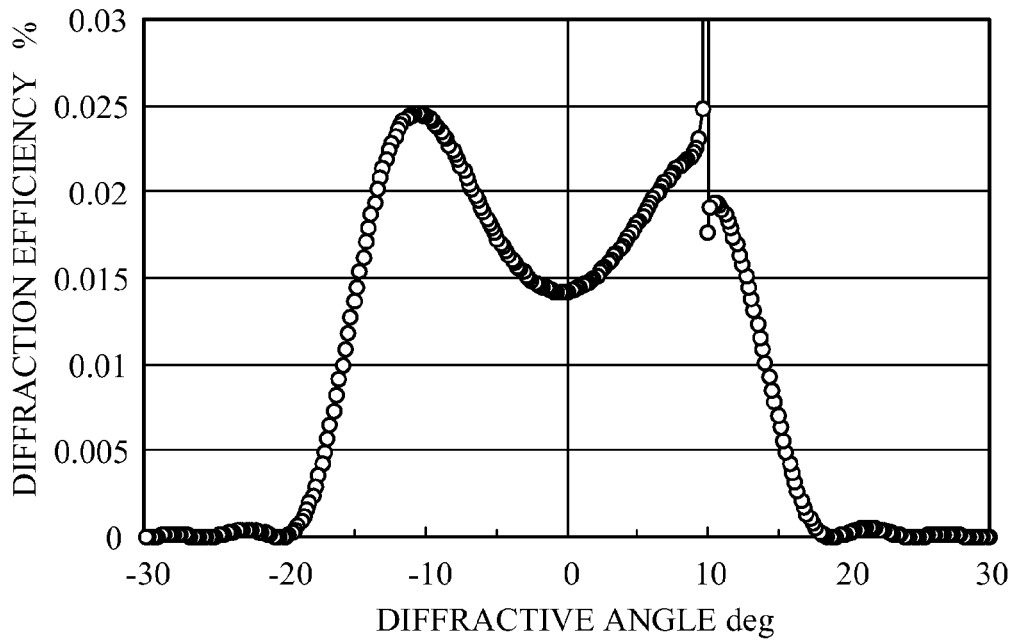
FIG. 27 is a graph of diffraction efficiencies for light having an incident angle of +10 degrees of the diffractive optical element in Comparative example 2.

Considering light that enters the diffractive optical element at an oblique incident angle of a downward direction with reference to the designed incident angle, FIG. 27 illustrates the RCWA calculation result on conditions that the incident angle is +10 degrees, the grating pitch is 100 μm, and the wavelength is 550 nm. FIG. 27 is a result of enlarging a part where the diffraction efficiency indicated by a vertical axis is small and of changing the lateral axis from the diffractive order to a diffractive angle to illustrate a high diffractive angle range. The diffraction efficiency of the +1st order diffracted light that is the designed order is concentrated, and the diffraction efficiency is 97.11%, which is decreased from 100% since the angle is inclined from 0 degree that is the designed incident angle. The remaining unnecessary light, as illustrated in FIG. 27, propagates as unnecessary light that has a peak in a specific angle direction. This unnecessary light has a peak in a direction of around −10 degrees, and the diffraction efficiency of this peak is 0.025%. This propagation direction is substantially equal to an emission direction of −10 degrees in which a component of the light having an off-screen incident angle of +10 degrees that enters the grating wall surface is totally reflected to be propagated. Since it enters the grating wall surface from the side of the high refractive index material to the side of the low refractive index material at an angle of +80 degrees that is larger than a critical angle of 74.2 degrees, the total reflection is generated. This unnecessary light is expanded from the peak in a direction of around −10 degrees to a high angle range. As illustrated in FIG. 23, this phenomenon may be caused by the fact that a component b' of the incident light entering the vicinity of the grating wall surface is totally reflected on the grating wall surface to propagate in a direction of −10 degrees and further the unnecessary light is expanded around an emission direction of the total reflection. Since the diffracted light of this unnecessary light reaches the imaging plane, the imaging performance is deteriorated.

Figure 28:
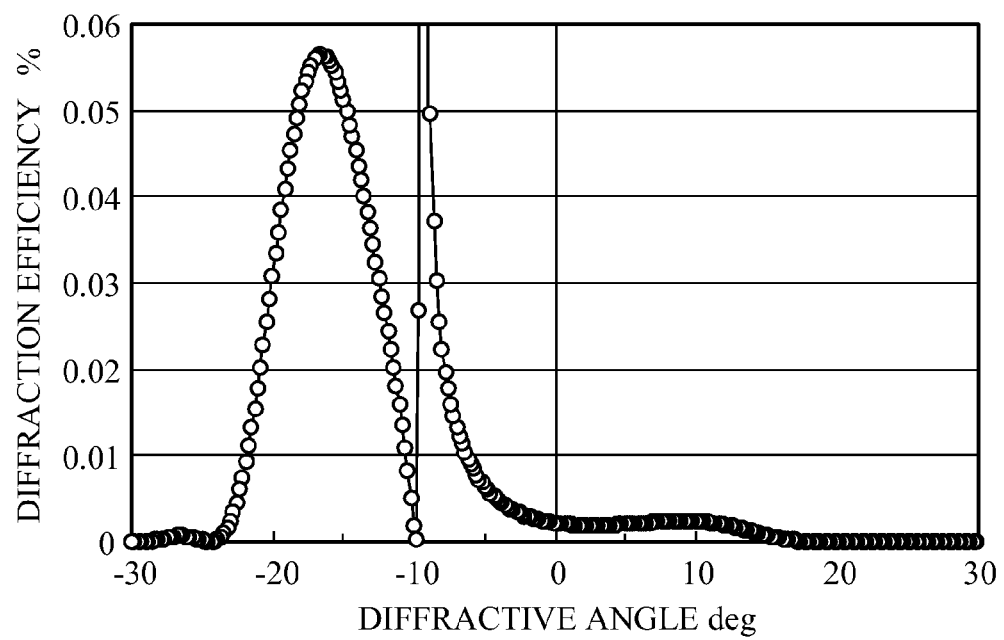
FIG. 28 is a graph of diffraction efficiencies for light having an incident angle of −10 degrees of the diffractive optical element in Comparative example 2.

Next, considering light that enters the diffractive optical element at an oblique incident angle of an upward direction with reference to the designed incident angle, FIG. 28 illustrates the RCWA calculation result on conditions that the incident angle is −10 degrees, the grating pitch is 100 μm, and the wavelength is 550 nm. FIG. 28 is a result of enlarging a part where the diffraction efficiency indicated by the vertical axis is small and of changing the lateral axis from the diffractive order to a diffractive angle to illustrate a high diffractive angle range. The diffraction efficiency of the +1st order diffracted light that is the designed order is concentrated, and the diffraction efficiency is 96.97%, which is decreased from 100% since the angle is inclined from 0 degree that is the designed incident angle. The remaining unnecessary light, as illustrated in FIG. 28, propagates as unnecessary light that has a peak in a specific angle direction. This unnecessary light has a peak in a direction of around −17 degrees, and the diffraction efficiency of this peak is 0.056%. The unnecessary light also has a small peak in a direction of around +10 degrees, and the diffracted efficiency of this peak is 0.0024%. This propagation direction is substantially equal to an emission direction of −18.6 degrees of the transmitted light and an emission direction of +9.5 degrees of the reflected light of the light having an off-screen incident angle of −10 degrees that enters the grating wall surface. Since it enters the grating wall surface from the side of the low refractive index material to the side of the high refractive index material at an angle of +80 degrees, the transmittance of the transmitted light is 91% and the reflectance of the reflected light is 9%, which corresponds to the fact that the peak in the direction of around −17 degrees is large and the peak in the direction of around +10 degrees is small. This unnecessary light is also expanded from the peaks to a high angle range. Thus, as illustrated in FIG. 25, a component c' of the incident light that enters the vicinity of the grating wall surface may be separated into the transmitted light and the reflected light on the grating wall surface, and further they may be expanded around each peak to be propagated. In particular, the diffracted light of the unnecessary light caused by the transmitted light is large, and the imaging performance is deteriorated since this unnecessary light reaches the imaging plane.

When the light of the off-screen incident angle of around 10 degrees enters the optical system in which the diffractive optical element as the comparative example is applied, the unnecessary light caused by the total reflection on the grating wall surface is generated for the m grating and the unnecessary light caused by the transmitted light on the grating wall surface is generated for the m' grating as illustrated in FIG. 26. These cause the deterioration of the imaging performance. When the diffractive optical element and the optical system are actually assembled to be used, the unnecessary light reaches the imaging plane and the deterioration of the imaging performance was confirmed.

Embodiment 11

Figure 20:
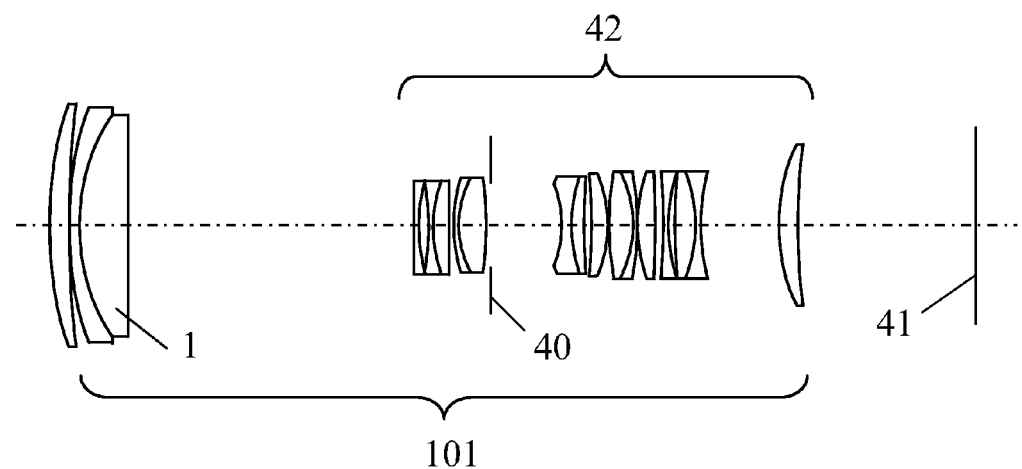
FIG. 20 is a schematic cross-sectional diagram of an image pickup optical system in Embodiment 11.

Next, Embodiment 11 of the present invention will be described. FIG. 20 is a schematic cross-sectional diagram of an image pickup optical system (an optical system) of a camera or the like. In FIG. 20, reference numeral 101 denotes an image pickup lens, and includes the diffractive optical element 1 of each of the embodiments described above, a stop 40, and a refractive optical element 42. Reference numeral 41 denotes an imaging plane such as a film or a CCD. In particular, the center of gravity of the distribution of the incident angle of the light entering each diffractive grating of the diffractive optical element 1 (same as the center of gravity of the diagram) is configured so as to be distributed nearer the center of the diffractive grating with reference to a surface normal at the center of the diffractive grating on the envelop plane. When the diffractive optical element of the present embodiment is applied to the optical system, a high-performance image pickup lens with low flare and with high resolution can be obtained since the generation of the unnecessary light is significantly reduced even when the light enters the grating wall surface. Since the diffractive optical element of each embodiment can be easily manufactured, an inexpensive optical system having superior mass productivity can be provided. In FIG. 20, the diffractive optical element 1 is provided on a bonding surface of a front lens, but the embodiment is not limited to this and it may also be provided on a lens surface, and a plurality of diffractive optical elements may also be used in the image pickup lens. In the present embodiment, the image pickup lens of the camera as an optical apparatus is described, but the embodiment is not limited to this. The optical system of the present embodiment can also be applied to an imaging optical system (an optical apparatus) that is used in a wide wavelength range such as an image pickup lens of a video camera, an image scanner of a business machine, or a reader lens of a digital copier.

Embodiment 12

Figure 21:
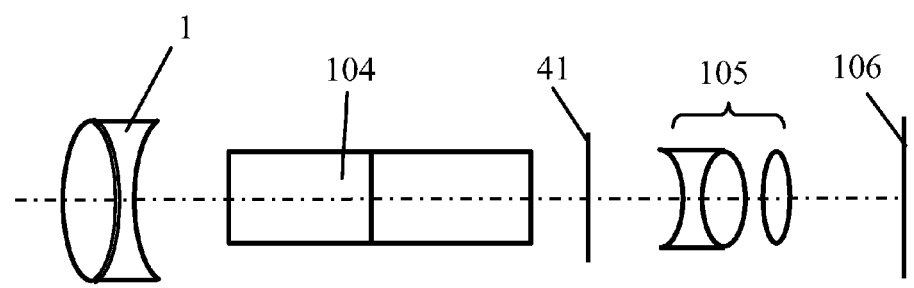
FIG. 21 is a schematic cross-sectional diagram of an observation optical system in Embodiment 12.

Next, Embodiment 12 of the present invention will be described. FIG. 21 is a schematic cross-sectional diagram of an observing optical system (an optical system) such as binoculars. In FIG. 21, reference numeral 1 denotes an objective lens that is a diffractive optical element, reference numeral 104 denotes a prism as an image inversion member that erects an image, reference numeral 105 denotes an eyepiece lens (a refractive optical element), and reference numeral 106 denotes an evaluation plane (a pupil plane). The diffractive optical element 1 is used for correcting chromatic aberration or the like on the imaging plane 41 of the objective lens. When the diffractive optical element of each embodiment is applied, a high-performance objective lens with low flare and with high resolution can be obtained since the generation of the unnecessary light is significantly reduced even when the light enters the grating wall surface. Since the diffractive optical element of each embodiment can be easily manufactured, an inexpensive observing optical system having superior mass productivity can be provided. In the present embodiment, the diffractive optical element is formed on the objective lens 1, but the embodiment is not limited to this, and the same effect can be obtained even when it is positioned on a surface of the prism or in the eyepiece lens. It is preferable that the diffractive optical element is at least provided at the side of the objective lens in the observing system by the naked eye because an effect of reducing the chromatic aberration is obtained only by the objective lens if it is provided at the object side with reference to the imaging plane. The present embodiment describes the binoculars as an optical apparatus, but it is not limited to this. As the optical apparatus, a ground-based telescope or an astronomical telescope may also be used, and the embodiment can also be applied to an optical finder such as a lens shutter camera or a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-133584, filed on Jun. 11, 2010, and Japanese Patent Application No. 2011-039196, filed on Feb. 25, 2011, which are hereby incorporated by reference herein in their entirety.

What is claimed is:

1. A diffractive optical element comprising:
   a first diffractive grating including a first grating surface and a first grating wall surface;
   a light shielding member disposed on the first grating wall surface; and
   a second diffractive grating including a second grating surface and a second grating wall surface, the second diffractive grating being disposed so that the second grating surface contacts the first grating surface and the second grating wall surface contacts the light shielding member,
   wherein the following expression is met:

$0.001 < k < 0.5$, where k is an extinction coefficient of a material that constitutes the light shielding member, and
   wherein a thickness of the light shielding member increases from a valley of one of the first or second diffracting grating that receives an incident light to an apex of the one diffractive grating.

2. The diffractive optical element according to claim 1, wherein:
   the first diffractive grating has a first refractive index,
   the second diffractive grating has a second refractive index different from the first refractive index, and
   the light shielding member reduces total reflection light and transmitted light of incident light on the first grating wall surface and the second grating wall surface.

3. The diffractive optical element according to claim 1, wherein the light shielding member has a film-shaped structure that is disposed between the first grating wall surface and the second grating wall surface.

4. The diffractive optical element according to claim 1, wherein a refractive index of the material constituting the light shielding member is higher than a refractive index of a material having the lower refractive index of materials constituting the first diffractive grating and the second diffractive grating.

5. The diffractive optical element according to claim 1, wherein the following condition is met:

$|nd3 - nd2| < 0.2$, where nd3 is a refractive index of the material constituting the light shielding member for d-line, and nd2 is a refractive index of a material having the higher refractive index of materials constituting the first diffractive grating and the second diffractive grating.

6. The diffractive optical element according to claim 1, wherein the following condition is met:

$W/P < 0.07$, where W is a width of whole of the light shielding member, and P is a grating pitch.

7. The diffractive optical element according to claim 1, wherein the light shielding member has a plurality of film-shaped structures configured by laminating members made of a plurality of materials different from each other.

8. The diffractive optical element according to claim 1, wherein a fine structure whose size is smaller than a wavelength is provided in an interface between the light shielding member and a grating wall surface of a diffractive grating having the higher refractive index of materials of the first diffractive grating and the second diffractive grating.

9. The diffractive optical element according to claim 8, wherein the following condition is met:

$p < 0.98 \times \lambda/n2$, where p is a pitch of the fine structure, n2 is a diffractive index of the material having the higher refractive index of the materials of the first diffractive grating and the second diffractive grating for the minimum wavelength in a use wavelength range, and λ is the minimum wavelength in the use wavelength range.

10. The diffractive optical element according to claim 1, wherein a fine structure whose size is smaller than a wavelength is provided in a medium between the light shielding member and a grating wall surface of a diffractive grating having the higher refractive index of materials of the first diffractive grating and the second diffractive grating.

11. The diffractive optical element according to claim 1, wherein the light shielding member includes a plurality of absorption materials having different extinction coefficients.

12. The diffractive optical element according to claim 11, wherein the light shielding member includes a layer having a refractive index of 1.55, an extinction coefficient of k=0.03 and a width of 0.2 μm, a layer having a refractive index of 1.40, an extinction coefficient of k=0.09 and a width of 0.25 μm, and a layer having a refractive index of 1.53, an extinction coefficient of K=0.03 and a width of 0.15 μm.

13. The diffractive optical element according to claim 1, wherein the material that constitutes the light shielding member is an absorption material having a refractive index of 1.55 and an extinction constant of k=0.1.

14. The diffractive optical element according to claim 13, wherein the light shielding member has a maximum thickness of 0.2 μm.

15. The diffractive optical element according to claim 14, wherein the first diffractive grating has a refractive index for a d-line of 1.504, an Abbe's number of 16.3, a partial dispersion ratio of 0.390 and a refractive index for wavelength 550 nm of 1.511, and the second diffractive grating has a refractive index for a d-line of 1.567, an Abbe's number of 47.0, a partial dispersion ratio of 0.569 and a refractive index for wavelength 550 nm of 1.570.

16. The diffractive optical element according to claim 1, wherein the light shielding member is smaller in height than the first grating wall surface and the second grating wall surface.

17. The diffractive optical element according to claim 1, wherein the first diffractive grating is larger in diffractive index than the second diffractive grating.

18. The diffractive optical element according to claim 17, wherein the thickness of the light shielding member increases from the valley of the first diffractive grating to the apex of the first diffractive grating.

19. An optical system comprising:
   a refractive optical element; and
   a diffractive optical element including:
   a first diffractive grating including a first grating surface and a first grating wall surface;
   a light shielding member disposed on the first grating wall surface; and
   a second diffractive grating including a second grating surface and a second grating wall surface, the second diffractive grating being disposed so that the second grating surface contacts the first grating surface and the second grating wall surface contacts the light shielding member,
   wherein the following expression is met:

$0.001 < k \leq 0.5$, where k is an extinction coefficient of a material that constitutes the light shielding member, and wherein a thickness of the light shielding member increases from a valley of one of the first or second diffractive grating that receives an incident light to an apex of the first diffractive grating.

20. An optical apparatus comprising:

an optical system including:

a refractive optical element; and a diffractive optical element including:

a first diffractive grating including a first grating surface and a first grating wall surface;

a light shielding member disposed on the first grating wall surface; and a second diffractive grating including a second grating surface and a second grating wall surface, the second diffractive grating being disposed so that the second grating surface contacts the first grating surface and the second grating wall surface contacts the light shielding member, wherein the following expression is met:

$$0.001 \leq k \leq 0.5,$$

where k is an extinction coefficient of a material that constitutes the light shielding member, and wherein a thickness of the light shielding member increases from a valley of one of the first or second diffractive grating that receives an incident light to an apex of the one diffractive grating.

* * * * *